(12) United States Patent
Dohmae

(10) Patent No.: US 11,829,674 B2
(45) Date of Patent: Nov. 28, 2023

(54) PRINTING SYSTEM, APPARATUS, AND METHOD, UTILIZING A VIRTUAL PRINTER

(71) Applicant: Kota Dohmae, Kanagawa (JP)

(72) Inventor: Kota Dohmae, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/658,720

(22) Filed: Apr. 11, 2022

(65) Prior Publication Data

US 2022/0357905 A1  Nov. 10, 2022

(30) Foreign Application Priority Data

May 6, 2021 (JP) .................. 2021-078541

(51) Int. Cl.
*G06F 3/12* (2006.01)

(52) U.S. Cl.
CPC .......... *G06F 3/1268* (2013.01); *G06F 3/1203* (2013.01); *G06F 3/1231* (2013.01); *G06F 3/1238* (2013.01); *G06F 3/1253* (2013.01); *G06F 3/1285* (2013.01)

(58) Field of Classification Search
None
See application file for complete search history.

(56) References Cited

U.S. PATENT DOCUMENTS

2017/0171399 A1   6/2017 Yamada et al.
2019/0129669 A1*  5/2019 Takahashi ............ G06F 3/1271

FOREIGN PATENT DOCUMENTS

JP   2017-111799    6/2017

* cited by examiner

*Primary Examiner* — Lennin R Rodriguezgonzalez
(74) *Attorney, Agent, or Firm* — IPUSA, PLLC

(57) ABSTRACT

An information processing system, an information processing apparatus, and a processing execution method. The information processing system in response to a transmission of a print job from a terminal device to a virtual printer registered in an external print service, receives information for identifying the virtual printer and the print job from the external print service, based on association information associating identification information of an application and information for identifying a virtual printer, identifies an application associated with the information for identifying the virtual printer that is received, and processes the print job by the application.

14 Claims, 30 Drawing Sheets

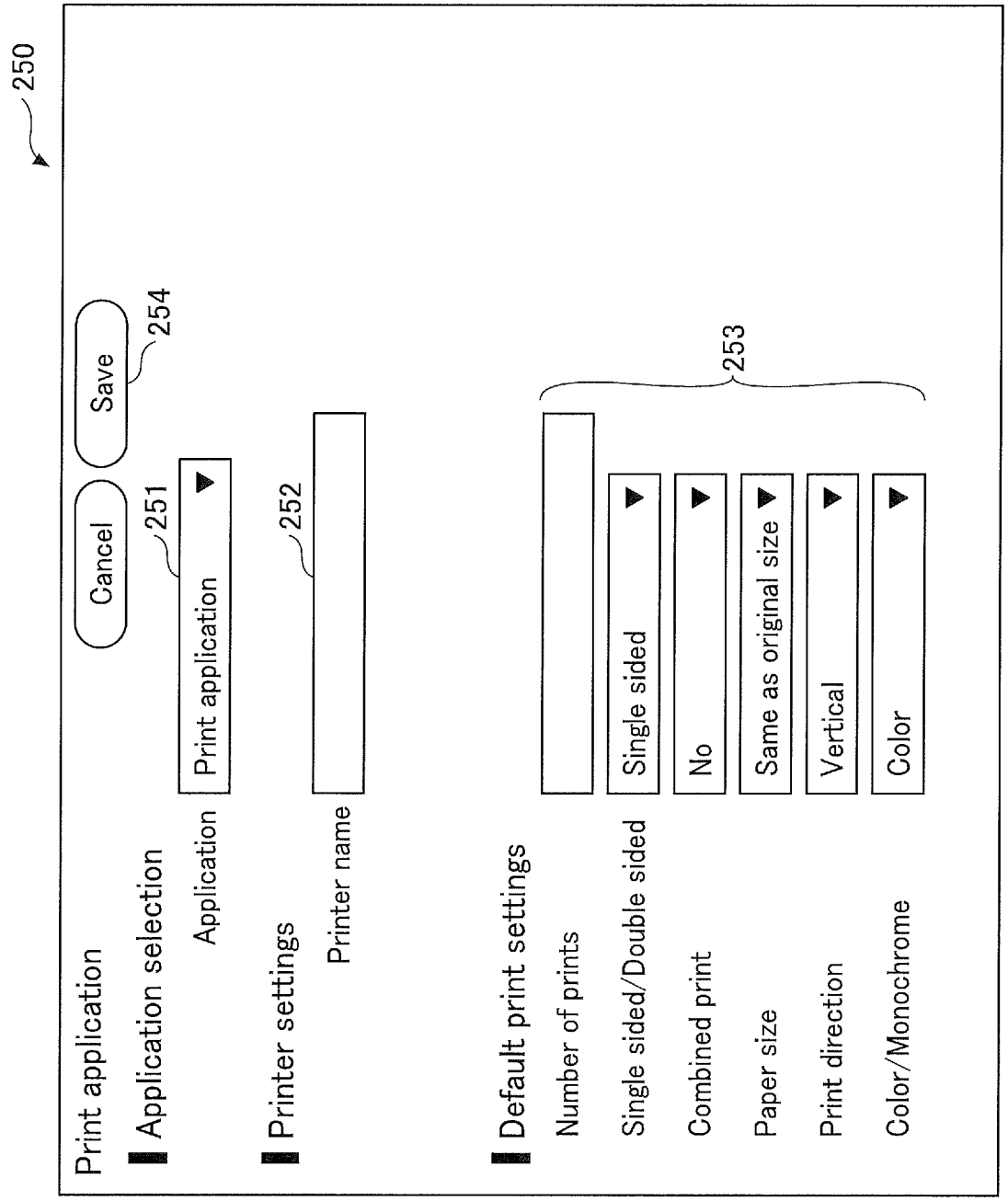

FIG. 13

| Name | Status | Share Status | Share Name |
|---|---|---|---|
| Virtual printer 1 | ⊙ Ready | ⊙ Printer Shared | Floor 1 |
| Virtual printer 2 | ⊙ Ready | ⊙ Printer Shared | Floor 2 |
| Virtual printer 3 | ⊙ Ready | ⊙ Printer Shared | Floor 3 |
| Virtual printer 4 | ⊙ Ready | ⊙ Printer Shared | Floor 4 |
| Virtual printer 5 | ⊙ Ready | ⊙ Printer Shared | Floor 5 |
| Virtual printer 6 | ⊙ Ready | ⊙ Printer Shared | Floor 6 |
| Virtual printer 7 | ⊙ Stopped | ⊙ Printer Shared | Floor 7 |
| Virtual printer 8 | ⊙ Ready | ⊙ Printer Shared | Floor 8 |

FIG. 16A

```
{
  "@odata.context": "https://graph.mm.com/beta/$metadata#print/printers
('c05f3726-0d4b-4aa1-8fe9-2eb981bb26fb')/jobs(tasks())/$entity",
  "id": "5182",
  "createdDateTime": "2020-06-30T17:18:52.3930472Z",
  "createdBy": {
    "id": "1234567890", Account is determined with this data
    "displayName": "user",
    "userPrincipalName": "sample1@abc.com" Account is determined with this data
  },                    ⌒281
  "status": {
    "processingState": "pendingHeld",
    "processingStateDescription": "The job is not a candidate for processing yet."
  },
  "tasks": [
    {
      "id": "d036638b-1272-4bba-9227-732463823ed3",
      "parentUrl": "https://graph.mm.com/beta/print/printers/
c05f3726-0d4b-4aa1-8fe9-2eb981bb26fb/jobs/5182",
      "status": {
        "state": "processing",
        "description": "The task is being processed."
      }
    }
  ]
}
```

FIG. 16B

```
{
  ...
  "userId": "user",
  "loginMailAddress": "sample1@abc.com",
  "uuid": "a0eebc99-9c0b-4ef8-bb6d-6bb9bd380a11",
  "allowedOpenidProviders": ["Office563"],
  "allowedOpenidProviderAccounts": [
    {
      "opId": "aaaaaaaa-aaaaa-aaa",
      "name": "Taro Yamada",
      "email": "user@onmm.com",
      "userPrincipalName": "user@onmm.com"
    }
  ],
  ...
}
```

282

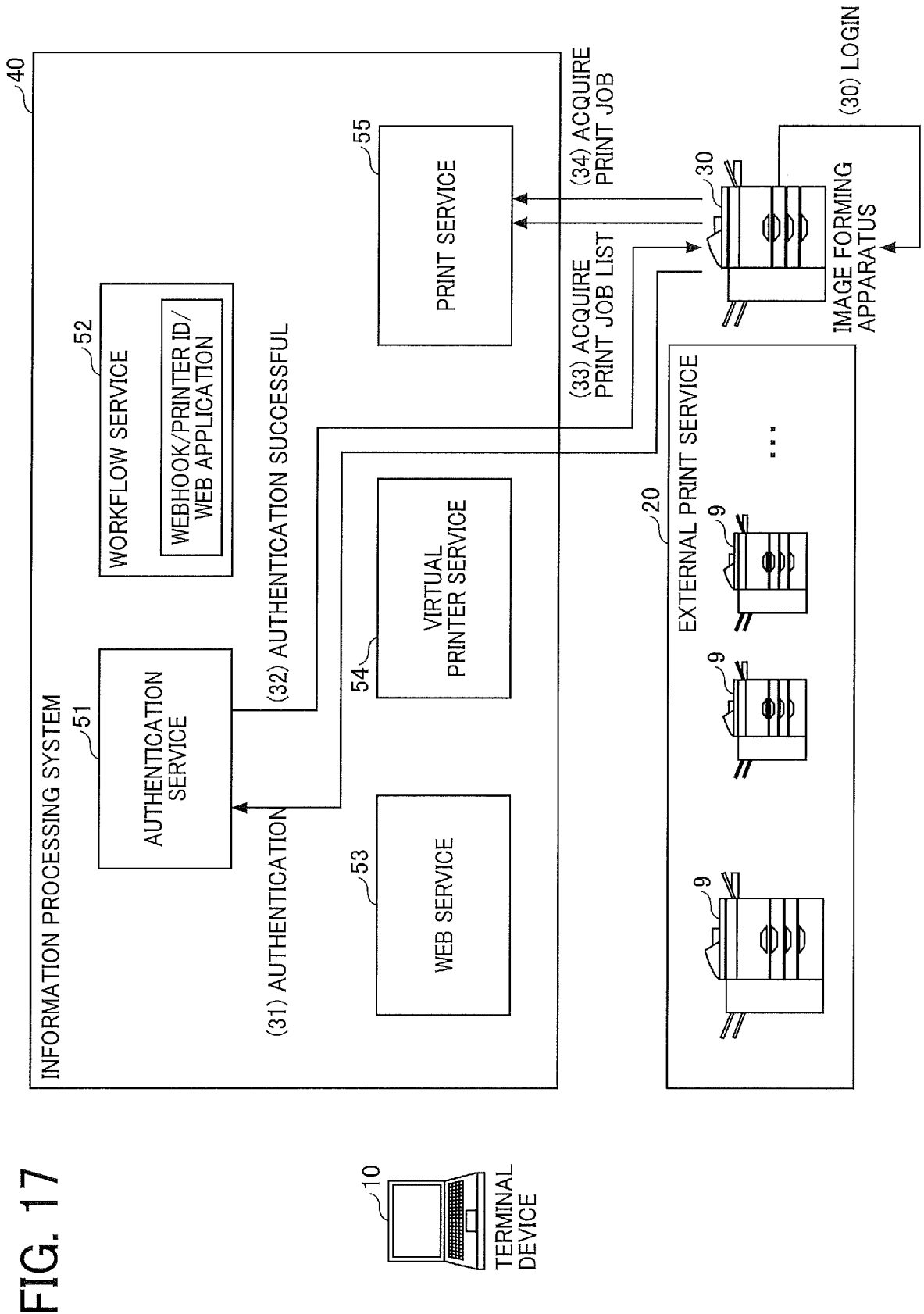

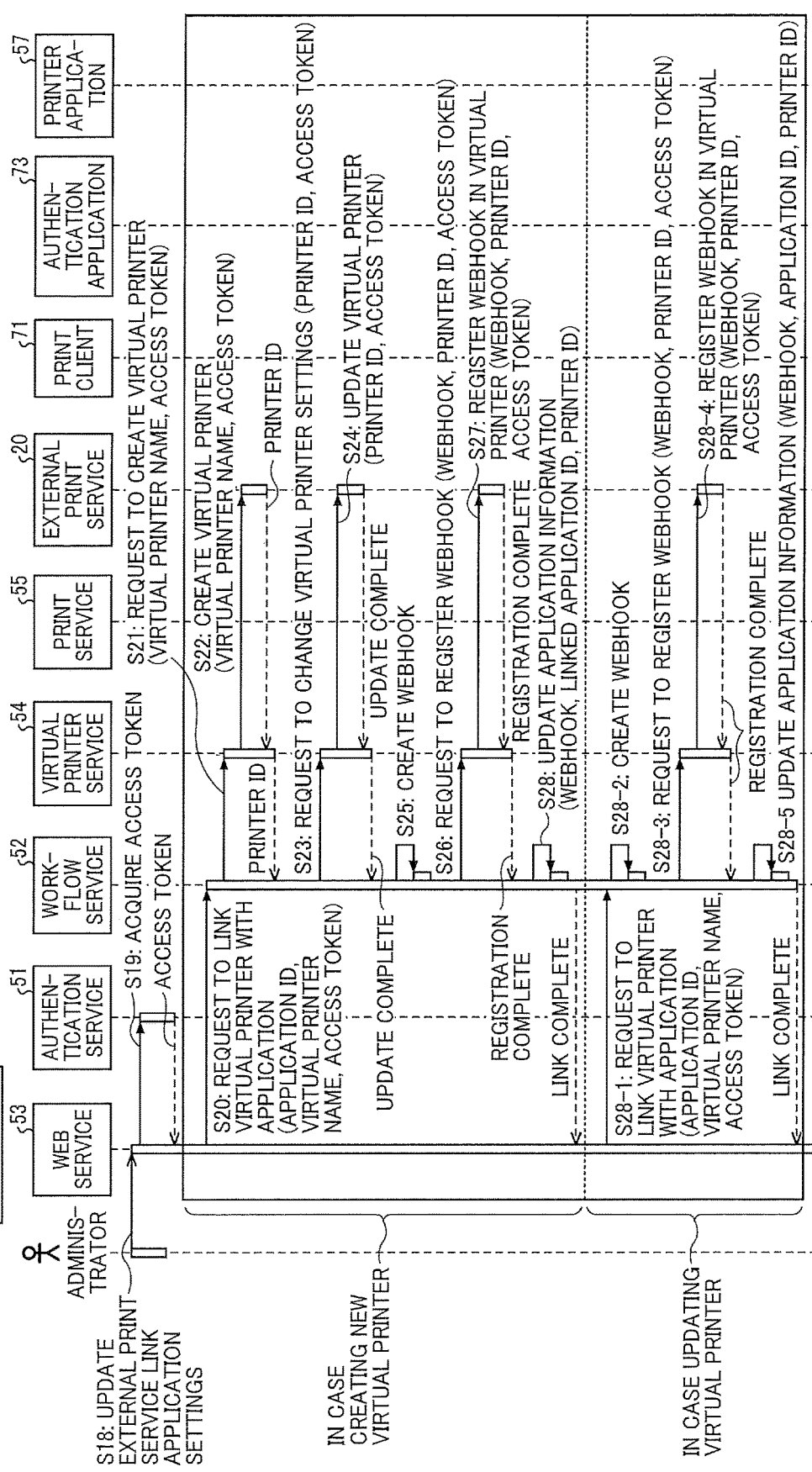

FIG. 24

```
Application ID
{
defaultAppId: "print-app-id01",  ~301
conditonalData: [  ~302
{
   appId: "print-app-id02", ~303
   conditonalTarget: "fileName", ~304
   conditonalMode: "include ", ~305
   conditonalValue: "nonUpload" ~306
},
{
   appId: "mail-app-id01", ~303
   conditonalTarget: "fileName", ~304
   conditonalMode: "include ", ~305
   conditonalValue: "test" ~306
}........
]
}
```

PRINTING SYSTEM, APPARATUS, AND METHOD, UTILIZING A VIRTUAL PRINTER

CROSS-REFERENCE TO RELATED APPLICATIONS

This patent application is based on and claims priority pursuant to 35 U.S.C. § 119(a) to Japanese Patent Application No. 2021-078541, filed on May 6, 2021, in the Japan Patent Office, the entire disclosure of which is hereby incorporated by reference herein.

BACKGROUND

Technical Field

The present disclosure relates to an information processing system, an information processing apparatus, and a processing execution method.

Related Art

The known external print service prints a print job transmitted from a terminal device that is connected through a network with an image forming apparatus registered in advance by a user. The external print service enables printing through the network without installing a printer driver on the terminal device. For example, a system stores a print job acquired from an external print service and transmits the stored print job to the image forming apparatus in response to a request from the image forming apparatus.

SUMMARY

Embodiments of the present disclosure describe an information processing system, an information processing apparatus, and a processing execution method. The information processing system in response to a transmission of a print job from a terminal device to a virtual printer registered in an external print service, receives information for identifying the virtual printer and the print job from the external print service, based on association information associating identification information of an application and information for identifying a virtual printer, identifies an application associated with the information for identifying the virtual printer that is received, and processes the print job by the application.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 12 is a diagram illustrating an example of an external print service link application setting screen;

FIG. 13 is a diagram illustrating an example of an external printer setting screen;

FIGS. 16A and 16B are a diagram illustrating an example of a user identifier (ID) included in a print job;

FIG. 17 is a diagram illustrating an example process in which the user executes the application through the image forming apparatus;

FIG. 24 is a diagram illustrating an example of an application execution condition associated with an application ID of application information in JavaScript Object Notation (JSON) format.

Figure 1:
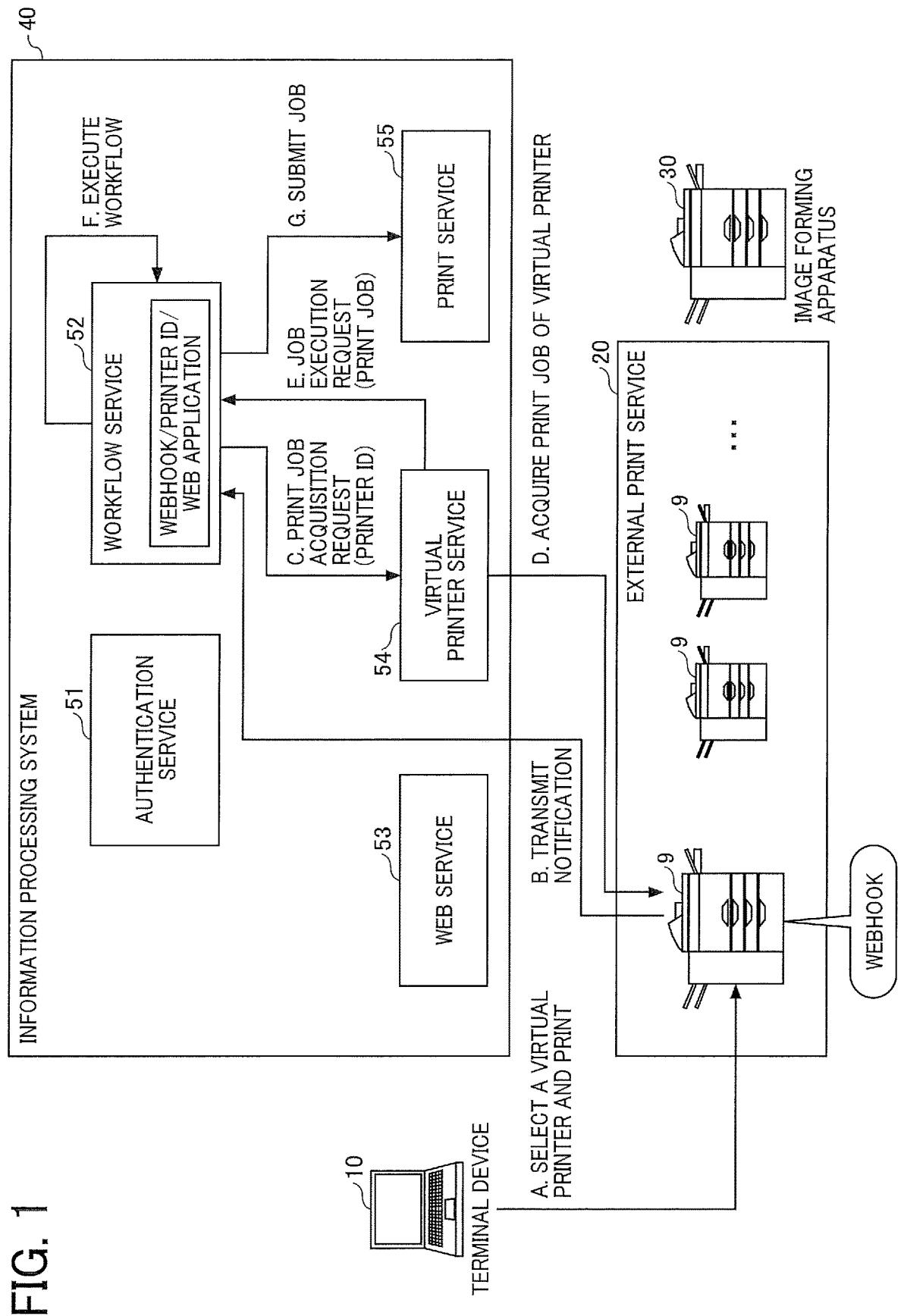
FIG. 1 is a diagram illustrating an example process in which a user executes printing with a virtual printer.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an example of the embodiment for carrying out the present disclosure, a printing system and a processing execution method performed by the printing system are described with reference to the drawings.

FIG. 1 is a diagram illustrating a process in which a user executes printing with a virtual printer 9. As described below, in an external print service 20, a webhook is registered in the virtual printer 9. At an information processing system 40, a uniform resource locator (URL) of the webhook, a printer ID of the virtual printer 9, and a web application are associated.

A. The user selects the virtual printer 9 and causes the terminal device 10 to send a print job to the external print service 20.

B. In response to receiving a submission of the print job, the external print service 20 sends a notification to the information processing system 40, addressing the URL of the webhook registered in the virtual printer 9. The external print service 20 may send the print job with the URL of the webhook if the print job can be sent. In such case, the information processing system 40 does not have to associate the printer ID of the virtual printer 9 with the web application (however, the URL of the webhook is associated with the web application).

C. In response to receiving the notification, the workflow service 52 sends a print job acquisition request to the virtual printer service 54 with the printer ID associated with the URL of the webhook.

D. The virtual printer service 54 designates the printer ID and sends the print job acquisition request to the external print service 20 to acquire the print job, which has been submitted.

E. The virtual printer service 54 transmits the acquired print job to the workflow service 52 and requests to execute the print job.

F. The workflow service 52 executes the web application associated with the printer ID to process the print job.

G. The workflow service 52 submits the print job processed by the web application to the print service 55. This print job is downloaded by an image forming apparatus 30. Alternatively, the print job processed by the web application may be transmitted by an email or stored in the storage service.

As described above, in the present embodiment, the virtual printer 9 created in the external print service 20 is used, and in the information processing system 40, the virtual printer 9 and the web application (flow) provided by the information processing system 40 are associated with each other. Accordingly, in response to a user request to the external print service 20 to print using the virtual printer 9, the information processing system 40 processes the print job using the web application. Since one or more processes for the print job are defined in the web application, a printing system can add the process to the print job.

Figure 2:
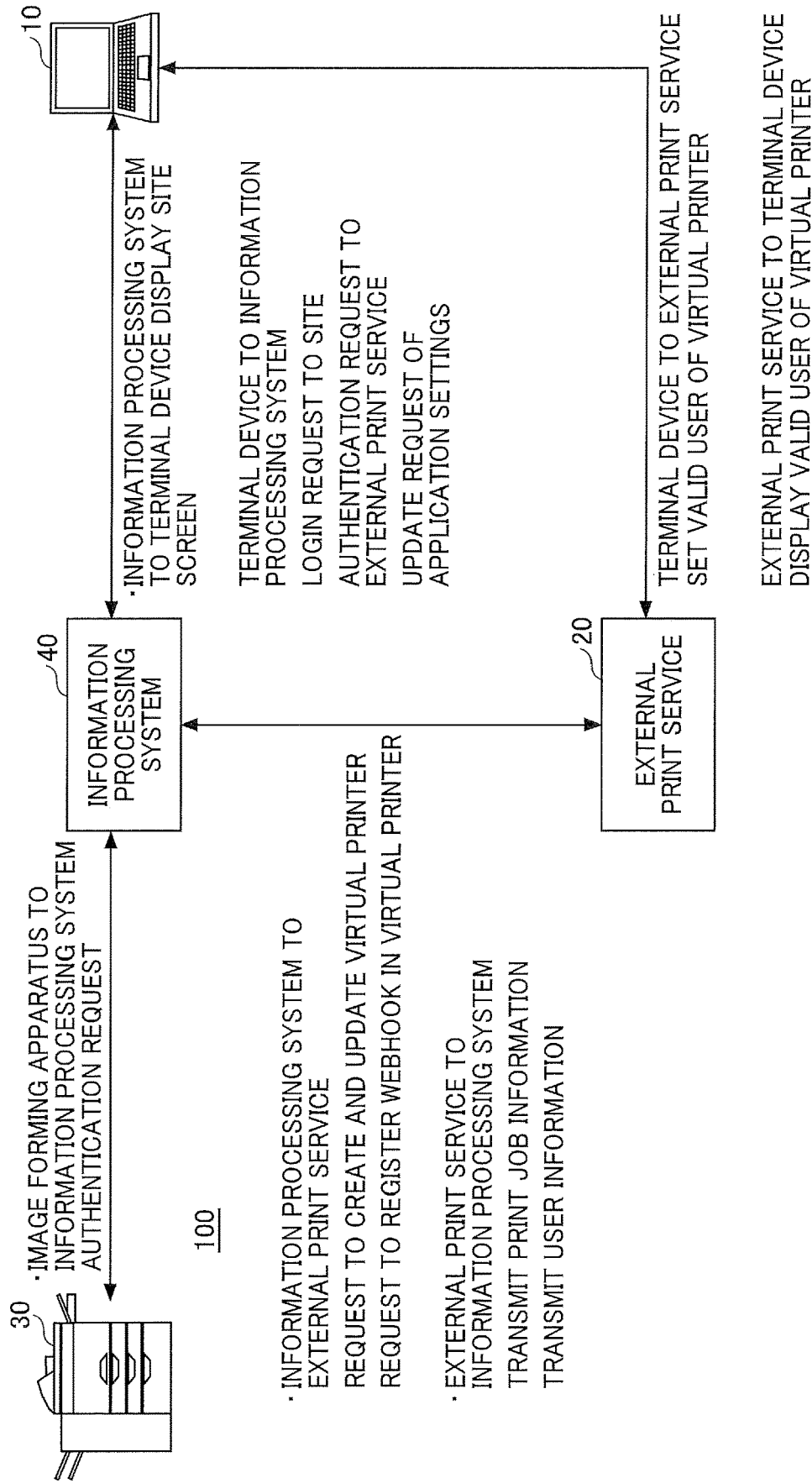
FIG. 2 is a diagram illustrating an example of a schematic configuration of a printing system.

An overall configuration of the printing system is described with reference to FIG. 2. FIG. 2 is a diagram illustrating an example of a schematic configuration of the printing system. The printing system includes the image forming apparatus 30 and the information processing system 40. The information processing system 40 communicates with the terminal device 10. The printing system communicates with the external print service 20. The external print service 20 communicates with the terminal device 10.

The information processing system 40 includes one or more information processing apparatuses, and communicates with the image forming apparatus 30, the external print service 20, and the terminal device 10 through a network. The information processing system 40 provides various services by a series of processes (flows) in cooperation with a cloud service. The information processing system 40 executes one or more processes (the series of processes) such as Portable Document Format (PDF) conversion, optical character recognition (OCR), upload to the cloud, email transmission, printing, translation, and voice recognition. The series of processes is provided by one application, and the series of processes is also called "process flow" and "workflow" in addition to "flow". The application is created by the user at the terminal device 10 by combining the processes.

The information processing system 40 may be implemented by cloud computing or may be implemented by a single information processing apparatus. The cloud computing refers to a usage pattern in which resources on a network are used without making the user aware of specific hardware resources.

The information processing system 40 may reside on the internet or may reside on-premises.

The image forming apparatus 30 executes the print job generated by the flow. Examples of the image forming apparatus 30 include an image processing apparatus such as a multifunction peripheral (MFP), a printing apparatus, a printer, or the like. Examples of the image forming apparatus 30 further include output devices such as a projector, an electronic whiteboard and the like. The image forming apparatus 30 may not be provided depending on contents of the flow. For example, an external storage server may be provided instead of the image forming apparatus 30.

The terminal device 10 is, for example, a desktop personal computer (PC), a notebook PC, a smartphone, a tablet terminal, or the like used by an administrator or a general user. In addition, the terminal device 10 may be any device capable of operating a web browser. The user operates the terminal device 10 to use various services provided by the information processing system 40 or the external print service 20, and further sets the application.

The external print service 20 includes one or more information processing apparatuses. The virtual printer is registered in the external print service 20, and the print job is submitted to the virtual printer. The external print service 20 of the present embodiment transmits the print job transmitted from the terminal device 10 to the information processing system 40. The image forming apparatus 30 acquires the print job from the information processing system 40 and prints an image based on the print job. By using the external print service 20, the user instructs the image forming apparatus 30 to print through the cloud without installing the printer driver in the terminal device 10.

Information Exchanged Between External Print Service 20 and Terminal Device 10

The external print service 20 uses a general-purpose printer driver to process the print job transmitted from the terminal device 10. Accordingly, the printer driver may not be installed in the terminal device 10. Information of a user who can use the virtual printer 9 (registered by the information processing system 40) is transmitted from the terminal device 10 to the external print service 20. The external print service 20 transmits a setting screen and information on available users to the terminal device 10.

Information Exchanged Between Information Processing System 40 and Terminal Device 10

A login request to the information processing system 40 (web service), an authentication and authorization request to the external print service 20 (single sign-on using OAuth and the like), and an application setting request are transmitted from the terminal device 10 to the information processing system 40. Screen information of the web service is transmitted from the information processing system 40 to the terminal device 10.

Information Exchanged Between Information Processing System 40 and External print service 20

A virtual printer creation request is transmitted from the information processing system 40 to the external print service 20. A webhook registration request to the virtual printer 9 is transmitted from the information processing system 40 to the external print service 20. A print job (including user information in the external print service 20) is transmitted from the external print service 20 to the information processing system 40. A detailed description is given below of the virtual printer 9 and webhook.

Information Exchanged Between Information Processing System 40 and Image Forming Apparatus 30

An authentication request is transmitted from the image forming apparatus 30 to the information processing system 40. The print job and an access token (access token for the information processing system 40) as a result of successful user authentication are transmitted from the information processing system 40 to the image forming apparatus 30.

In the present embodiment, a multi-tenant service (a mechanism in which the administrator user and the general user exist for each company or customer who uses the service) is presupposed, and the administrator user and the general user are described separately. However, the administrator and the general user may not be distinguished.

In the following description, privilege for the administrator may be provided even for the general user, and the administrator may not exist. Moreover, the term "user" used in the present embodiment indicates the general user.

The external print service 20 is a term for contrasting with an internal print service (a service in which the terminal device 10 prints with a printer in a local area network (LAN) using a printer driver installed in the terminal device 10). The external print service 20 is a service that allows printing with the image forming apparatus 30 registered in advance, through the cloud without installing the printer driver on the PC. For example, universal print and cloud print are known.

A flow is a series of processes implemented by an application developer by connecting a plurality of processes. For example, a series of processes such as PDF conversion, OCR, upload to cloud, and email transmission is called the flow. In the present embodiment, the "flow" is used in almost the same meaning as the web application (hereinafter, simply referred to as an application).

A workflow service is a service that executes the flow when the application developer creates the flow or the user executes the application. The user can select and execute the application on the image forming apparatus 30 and automatically execute the application by sending the email to the designated email address. In the present embodiment, the workflow service designates and executes the application based on the URL registered in the webhook by the information processing system 40.

The webhook is a mechanism for sending a request to the URL of the webhook when an event (print job input to the virtual printer 9) occurs. The webhook is registered in the external print service 20. The use of webhook is an example of a mechanism that allows the workflow service to know that printing has been executed by the virtual printer 9.

The flow of processing using the webhook according to the present embodiment is as follows.
  (i) The administrator sets the external print service 20 to send the URL of the webhook to the information processing system 40 in response to the execution of printing by the virtual printer 9 (setting on the external print service 20).
  (ii) In response to the selection of the virtual printer 9 and execution of the printing by the user, the external print service 20 notifies the information processing system 40 of the URL of the webhook.
  (iii) The information processing system 40 identifies from the URL of the webhook, which virtual printer 9 is requested to print and which application the URL of the webhook is associated with.
  (iv) The information processing system 40 acquires the print job from the virtual printer 9.
  (v) After acquiring the print job, the information processing system 40 executes the identified application.

The virtual printer 9 is a printer object of the external print service 20 to which a physical printer is not connected. In response to the print instruction to the virtual printer 9 from the user, the information processing system 40 holds the print job. Then, the user logs in to the image forming apparatus 30 and executes printing.

The application ID is a unique identification information of the application. The application ID is associated with the virtual printer 9.

The external print service link application is an application for the administrator to associate the virtual printer 9 of the external print service 20 with the application in one to one or one to multiple correspondence.

The information to identify the virtual printer may be any information that is associated with the printer ID of the virtual printer in the information processing system 40. In the present embodiment, the information to identify the virtual printer is, for example, the URL of the webhook.

A hardware configuration of the information processing system 40 and the terminal device 10 according to the present embodiment is described with reference to FIG. 3.

Figure 3:
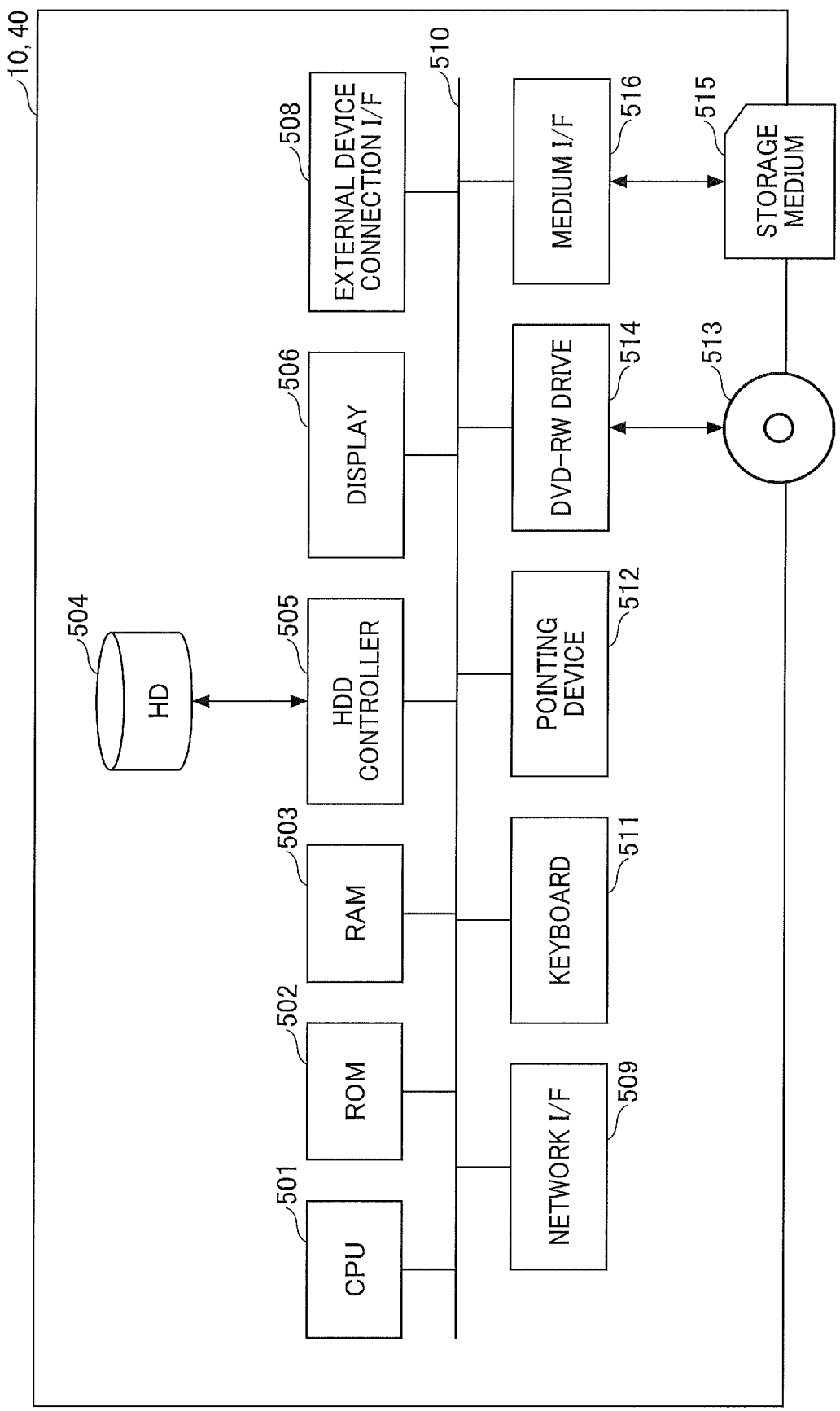
FIG. 3 is a block diagram illustrating a hardware configuration of an example of an information processing system and a terminal device.

FIG. 3 is a block diagram illustrating the hardware configuration of an example of the information processing system 40 and the terminal device 10. As illustrated in FIG. 3, the information processing system 40 and the terminal device 10 are each implemented by a computer including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, network I/F 509, a bus line 510, a keyboard 511, a pointing device 512, a digital versatile disc-rewritable (DVD-RW) drive 514 and a medium I/F 516.

The CPU 501 controls overall operation of the information processing system 40 and the terminal device 10. The ROM 502 stores a control program such as an initial program loader (IPL) to boot the CPU 501. The RAM 503 is used as a work area for the CPU 501. The HD 504 stores various data such as the programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a Universal Serial Bus (USB) memory, a printer, or the like. The network I/F 509 is an interface for performing data communication using the network. The bus line 510 is an address bus, a data bus, or the like for electrically connecting each component such as the CPU 501 illustrated in FIG. 3.

The keyboard 511 is an example of an input device provided with a plurality of keys for allowing a user to input characters, numerals, or various instructions. The pointing device 512 is an example of the input device that allows a user to select or execute a specific instruction, select a target for processing, or move a cursor being displayed. The DVD-RW drive 514 reads and writes various data from and to a DVD-RW 513, which is an example of a removable storage medium. The DVD-RW may be a digital versatile disc-recordable (DVD-R) or the like. The medium I/F 516 controls reading and writing (storing) of data from and to a storage medium 515 such as a flash memory.

Figure 4:
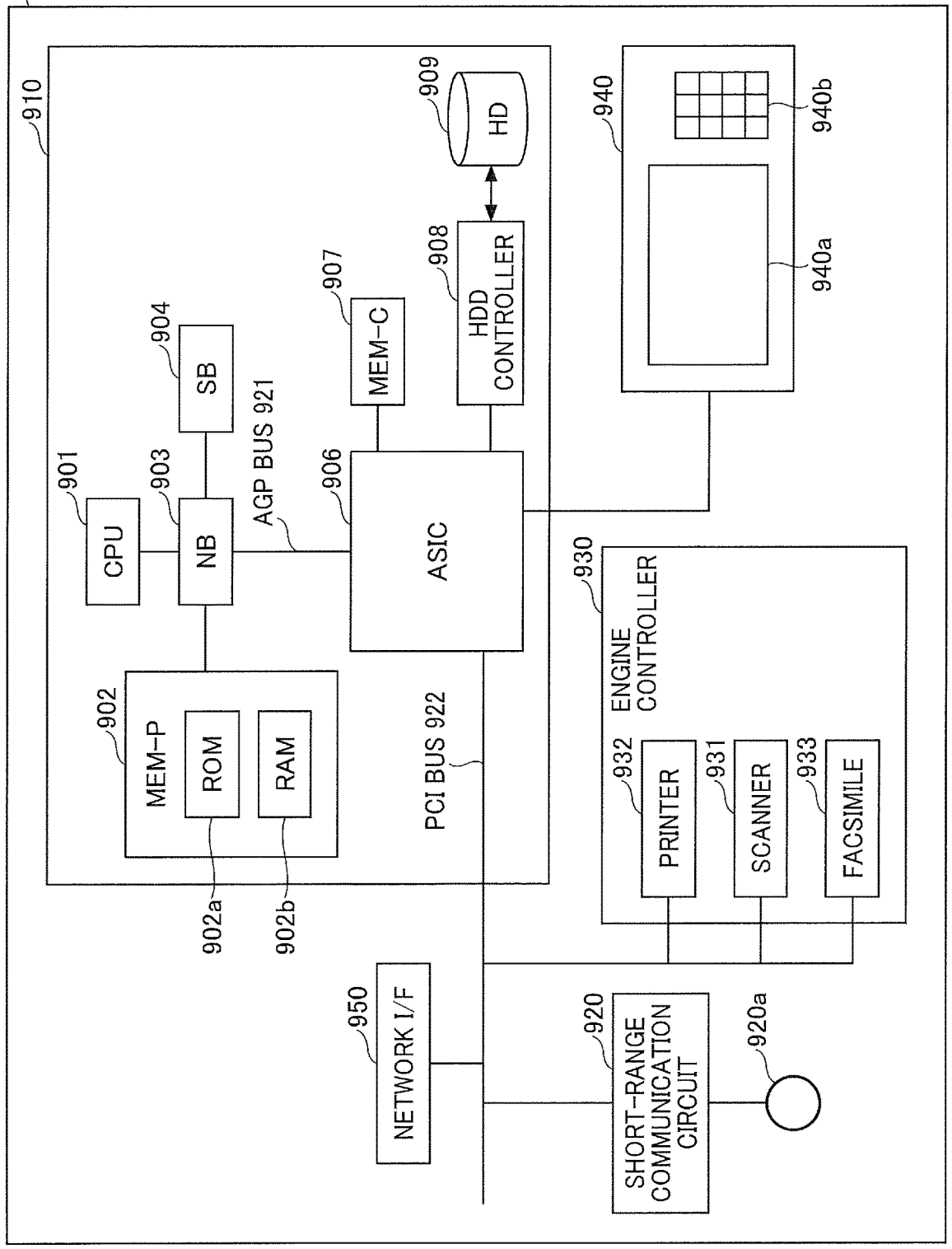
FIG. 4 is a block diagram illustrating a hardware configuration of an example of an image forming apparatus.

FIG. 4 is a block diagram illustrating a hardware configuration of an example of the image forming apparatus 30. As illustrated in FIG. 4, the image forming apparatus 30 includes a controller 910, a short-range communication circuit 920, an engine controller 930, a control panel 940, and a network IF 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the image forming apparatus 30. The NB 903 connects the CPU 901 with the MEM-P 902, SB 904, and AGP bus 921 and includes a memory controller for controlling reading or writing operation of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907 as a bridge. The ASIC 906 is a PCI target and an AGP master, an arbiter (ARB) which is the core of the ASIC 906, a memory controller which controls MEM-C 907, a plurality of Direct Memory Access Controllers (DMACs) which rotate image data by hardware logic and the like, and a PCI unit that transfers data between a scanner 931, a printer 932, and a facsimile 933 through the PCI bus 922. The ASIC 906 may include a USB interface and an Institute of Electrical and Electronics Engineers 1394 (IEEE1394) interface and may be connected to these interfaces.

The MEM-C 907 is a local memory used as a buffer for image data to be copied or a code buffer. The HD 909 is a storage that stores image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

Further, the engine controller 930 includes the scanner 931, the printer 932, and the facsimile 933. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls entire operation of the image forming apparatus 30. For example, the controller 910 controls rendering, communication, or user inputs to the control panel 940. The scanner 931 or the printer 932 includes an image processing unit such as error diffusion processing and gamma conversion processing.

In response to an instruction to select a specific application through the control panel 940, for example, using a mode switch key, the image forming apparatus 30 selectively performs a document box function, a copy function, a print function, and a facsimile function. In the image forming apparatus 30, a document box mode is selected when the document box function is selected, a copy mode is selected when the copy function is selected, a print mode is selected when the print function is selected, and a facsimile mode is selected when the facsimile function is selected.

The network I/F 950 is an interface for performing data communication using the network. The short-range communication circuit 920 and the network I/F 950 are electrically connected to the ASIC 906 through the PCI bus 922.

Figure 5:
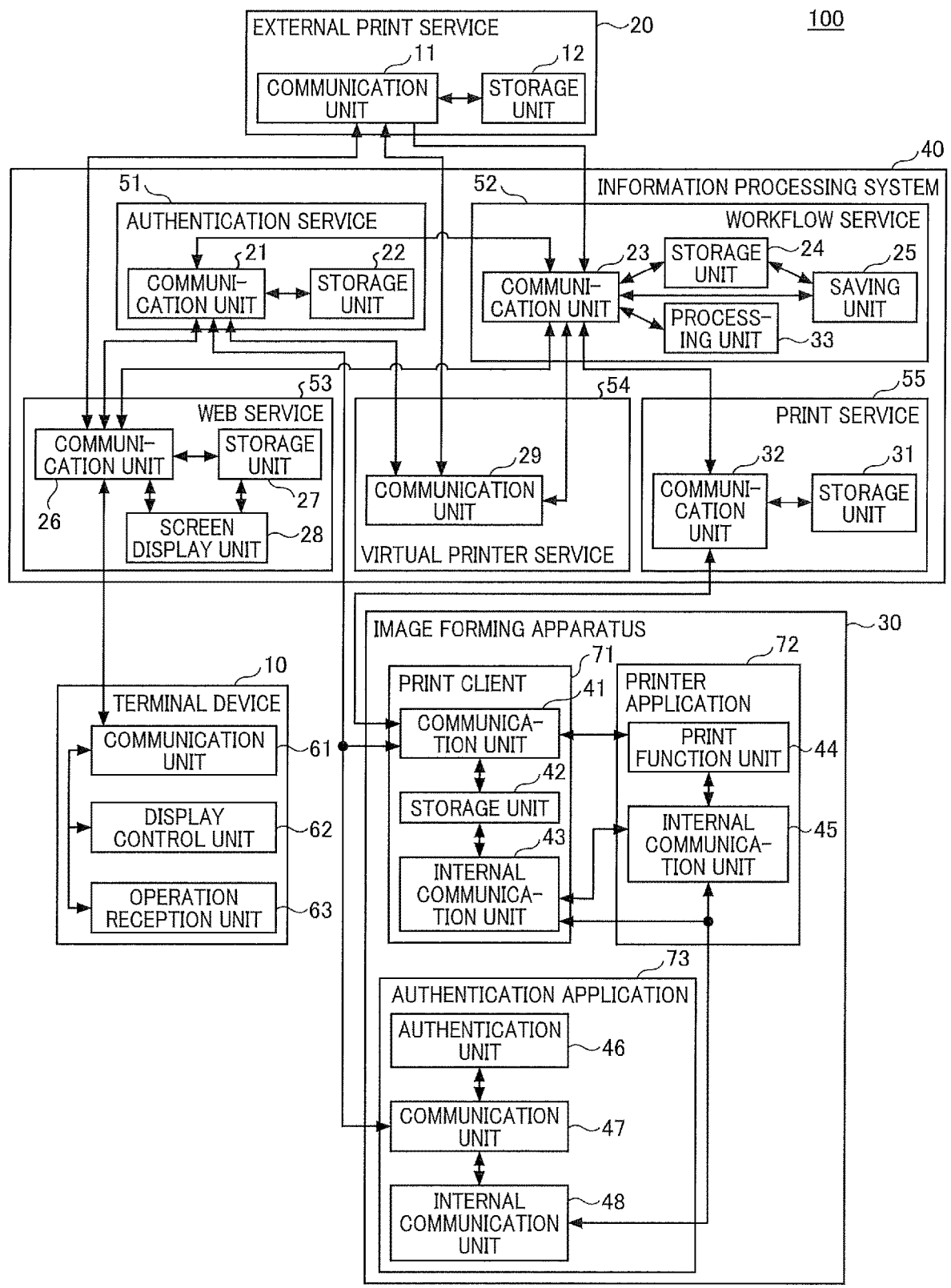
FIG. 5 is a block diagram illustrating an example of a functional configuration of an external print service, the information processing system, the image forming apparatus, and the terminal device.

FIG. 5 is a block diagram illustrating an example of a functional configuration of the external print service 20, the information processing system 40, the image forming apparatus 30, and the terminal device 10.

The external print service 20 includes a communication unit 11. This function of the external print service 20 is implemented by the CPU 501 executing an instruction included in one or more programs of the computer on the RAM 503.

The communication unit 11 communicates with the information processing system 40 and the terminal device 10. The communication unit 11 executes authentication using OAuth or the like for the communication from the web service 53 of the information processing system 40. The communication unit 11 receives a virtual printer creation request and webhook registration from the virtual printer service 54. Further, the communication unit 11 transmits firing of the webhook event to the workflow service 52 (notifies that a preset event has occurred in the webhook. In the present embodiment, the event is a print job input and the URL of the webhook is transmitted).

Further, the external print service 20 includes a storage unit 12. The storage unit 12 is implemented by the HD 504, RAM 503, ROM 502, etc. of the computer. The storage unit 12 stores the virtual printer 9 and user information.

The information processing system 40 includes an authentication service 51, a workflow service 52, a web service 53, a virtual printer service 54, and a print service 55.

These functions of the information processing system 40 are implemented by the CPU 501 executing instructions included in one or more programs of the computer on the RAM 503.

A. Authentication Service

The authentication service 51 is a service that performs user authentication and authorization, tenant management, and the like. The authentication service 51 includes a communication unit 21 and a storage unit 22.

The communication unit 21 receives the access token or the like for communication with the external print service 20 from the web service 53 and stores the access token in the storage unit 22. The communication unit 21 receives the user ID of the external print service 20 included in the print job from the virtual printer service 54 and returns the access token of the user.

The storage unit 22 stores user information, application information, and tenant information.

TABLE 1

External Service Link Authentication Information

| User ID | Email Address | External Service ID | Access Token | Refresh Token |
|---|---|---|---|---|
| admin | sample@abc.com | External_print_service Example of external print service | 1234567890 | abcdefghijklmnopqr |

Table 1 is an example of user information (No. 1) stored in the storage unit 22 of the authentication service 51. Items included in Table 1 are described below. In the user information (No. 1), information related to a person (for example, the administrator or the user) who associates the virtual printer 9 with the application is registered.

The user ID is the identification information of the user in the information processing system 40.
In Table 1, the user ID is admin (administrator), but the user ID may be a general user. In the present embodiment, the user in Table 1 includes both general user and administrator.
An email address is the email address of the user. The email address is used to identify the user. The email address may serve as the user ID.
The external service ID is identification information of an external service such as the external print service 20.
The access token is for the user to receive the service of the external service. This access token is issued by the external print service 20. The workflow service 52 uses the access token to register the webhook in the external print service 20. The workflow service 52 uses this access token to acquire the print job from the virtual printer service 54.
A refresh token is used to reacquire the expired access token.

TABLE 2

User Information

| User Identifier (Information Processing System) | Email Address (Used as user identification information by external print service) | Access Token (Information Processing System) | Refresh Token (Information Processing System) | External ServiceLink Information | | |
|---|---|---|---|---|---|---|
| | | | | External Service ID | Access Token | Refresh Token | Tenant ID |
| a0eebc99-9c0b-4ef8-bb6d-6bb9bd380a11 | sample1@abc.com | jklmopqr | jklmopqr | External_print_service | 1234567890 | Abcdefghijklmnopqr | 123456 |
| a0eebc99-9c0b-4ef8-bb6d-6bb9bd380a12 | sample2@abc.com | jklmopqs | jklmopqs | External_print_service | 9876543210 | Abcdefghijklmnopqs | 345678 |
| a0eebc99-9c0b-4ef8-bb6d-6bb9bd380a13 | sample3@abc.com | jklmopqt | jklmopqt | External_print_service | None | None | 123456 |

Table 2 is an example of user information (No. 2) stored by the authentication service 51. The user information (No. 2) stores information on the users belonging to a tenant. Multiple users can belong to each tenant. The tenant is a company or organization that has contracted to receive a service from a service provider (information processing system in the present embodiment).

A user identifier is user identification information in the information processing system 40.
The email address is the email address of the user.
The access token and the refresh token are authentication information for executing the application in the information processing system 40 (issued by the information processing system 40).
The external service ID is the identification information of the external print service 20.
The access token and refresh token of the external service link information are authentication information for requesting processing from the external service including the external print service 20 (issued by the external print service 20).

A tenant ID is identification information of the tenant to which the user belongs.

The user information of the authentication service 51 and the tenant information of the workflow service 52 described below are associated with each other by the tenant ID.

B. Workflow Service

The workflow service 52 is a service that submits the print job and executes the series of flows. The workflow service 52 includes a communication unit 23, a storage unit 24, a saving unit 25, and a processing unit 33.

The communication unit 23 transmits a request for creating a virtual printer or registering a webhook to the virtual printer service 54. The communication unit 23 receives the URL of the webhook registered in the virtual printer 9 of the external print service 20. The communication unit 23 transmits the printer ID to the external print service 20 and receives the print job associated with the virtual printer. The communication unit 23 transmits a print job to the print service 55. The communication unit 23 receives an update of the application information from the web service 53.

The saving unit 25 creates the webhook, registers the webhook in the external print service 20, and registers the URL of the webhook, the application ID, and the printer ID in the application information. The saving unit 25 determines the application or the virtual printer 9 to be executed based on the URL of the webhook.

The processing unit 33 processes the print job received by the communication unit 23 by the application identified based on the webhook. That is, the processing unit 33 is implemented by the application.

The storage unit 24 stores the application information and the token information. The application information is associated with the application ID, the printer ID, a signature (identification information) of webhook, and the user identifier set by the application.

TABLE 3

Application Information

| Application ID (Link setting ID) | Printer ID | Signature | User identifier in which application is set (identifier of administrator who registered application) |
|---|---|---|---|
| External-print-app-id01 | abcdefghijklmnopqr | fjp23jtij3ahi34ht3ihihag834hgiah34 | a0eebc99-9c0b-4ef8-bb6d-6bb9bd380a11 information of administrator |
| External-print-app-id01 | abcdefghijklmnopqs | tsf09hsdf9hfa64lo2nsxcgh231hgiah11 | a0eebc99-9c0b-4ef8-bb6d-6bb9bd380a12 information of administrator |

Table 3 schematically illustrates the application information.

The application ID is identification information of the application that executes one or a series of processes.

The printer ID is the identification information of the virtual printer 9.

The signature of the webhook is the identification information of the webhook associated with the virtual printer 9. The signature becomes part of the UIRL of the webhook.

The user identifier in which the application is set is the identification information of the user (administrator in the present embodiment) who has registered the application.

TABLE 4

Tenant Information

| Tenant ID | Link Setting ID (information to identify setting information set on external print service link application setting screen) | Application extended information (For managing application extended information for each tenant. In this example, information on virtual printers and linked application.) | |
|---|---|---|---|
| | | Application ID (ID of existing application to be linked) | Printer ID |
| 123456 | External-print-app-id01<br>External-print-app-id02 | print-app-id01<br>print-app-id02 | abcdefghijklmnopqr<br>abcdefghijklmnopqs |

TABLE 4-continued

Tenant Information

| Tenant ID | Link Setting ID (information to identify setting information set on external print service link application setting screen) | Application extended information (For managing application extended information for each tenant. In this example, information on virtual printers and linked application.) | |
|---|---|---|---|
| | | Application ID (ID of existing application to be linked) | Printer ID |
| 345678 | External-scan-app-id01 | print-app-id01 | abcdefghijklmnopqu |
| 456789 | External-mail-app-id01 | mail-app-id01 | abcdefghijklmnopqt |

Table 4 schematically illustrates the tenant information. Information on each tenant is stored in the tenant information. The application linked with the external print service 20 has the link setting ID and the printer ID registered.

The tenant ID is the identification information of the tenant.

The link setting ID is identification information for identifying the setting information set on the external print service link application setting screen described below.

The application ID is identification information of the application of the information processing system 40 executed at the time of printing by the virtual printer 9. That is, the application ID is the identification information of the application selected on the external service link application setting screen.

The printer ID is identification information indicating the virtual printer 9 of the external print service 20.

In the case the workflow service 52 receives a notification of the URL of the webhook, the workflow service 52 can perform processing using the access token of the administrator without additional authentication.

C. Web Service

The web service 53 is a website (for example, an external print service link application setting screen) that accepts settings of the external print service 20 and the application from the user. The web service 53 includes a communication unit 26, a screen display unit 28, and a storage unit 27.

The communication unit 26 receives authentication and authorization requests from the terminal device 10 to the external print service 20. The communication unit 26 receives a request for adding the authentication and authorization information to the authentication service 51. The communication unit 26 receives the application setting request to the workflow service 52.

The screen display unit 28 generates a screen displayed by the terminal device 10 connected to the web service 53. The screen displayed by the terminal device 10 is, for example, a login screen, the external service link screen, the external print service link application setting screen, and the like.

The storage unit 27 stores the login information of the administrator and the like.

D. Virtual Printer Service

The virtual printer service 54 is a service for the information processing system 40 to link with the virtual printer 9 of the external print service 20. The virtual printer service 54 includes a communication unit 29.

The communication unit 29 receives a print job (including user information for executing the print job) of the virtual printer 9 from the external print service 20 by using the access token issued by the external print service 20 acquired from the authentication service 51.

E. Print Service

The print service 55 is a service that receives the print job from the workflow service 52 (acquires the print job from the virtual printer 9 of the external print service 20) and returns the print job in response to a request from the image forming apparatus 30.

The print service 55 includes a communication unit 32 and a storage unit 31. The communication unit 32 receives the print job and a job completion notification from the workflow service 52. The communication unit 32 transmits the print job to the image forming apparatus 30. The print job is stored in the storage unit 31.

The image forming apparatus 30 includes a print client 71, a print application 72, and an authentication application 73. The print client 71 is a native application for acquiring a print job from the information processing system 40. The print client 71 includes a communication unit 41, a storage unit 42, and an internal communication unit 43.

The communication unit 41 transmits and receives data to and from the authentication service 51 and the print service 55. The communication unit 41 requests the print job from the print service 55 and receives the print job.

The storage unit 42 stores the print job. The internal communication unit 43 transfers data in the image forming apparatus 30 such as a print processing request to the print application 72.

The print application 72 performs processing related to printing in the image forming apparatus 30. The print application 72 prints the designated print job. The print application 72 includes a print function unit 44 and an internal communication unit 45.

The print function unit 44 prints the print job acquired from the print client 71. The internal communication unit 45 transfers data in the image forming apparatus 30 such as receiving a print request from the print client 71.

The authentication application 73 includes an authentication unit 46, a communication unit 47, and an internal communication unit 48. The communication unit 47 communicates with the authentication service 51, transmits authentication information to the authentication service 51, and receives a user's access token. The authentication unit 46 receives the user's authentication information from the login screen or the like and transmits the authentication information to the communication unit 47. The internal communication unit 48 transfers data within the image forming apparatus 30.

Figure 6:
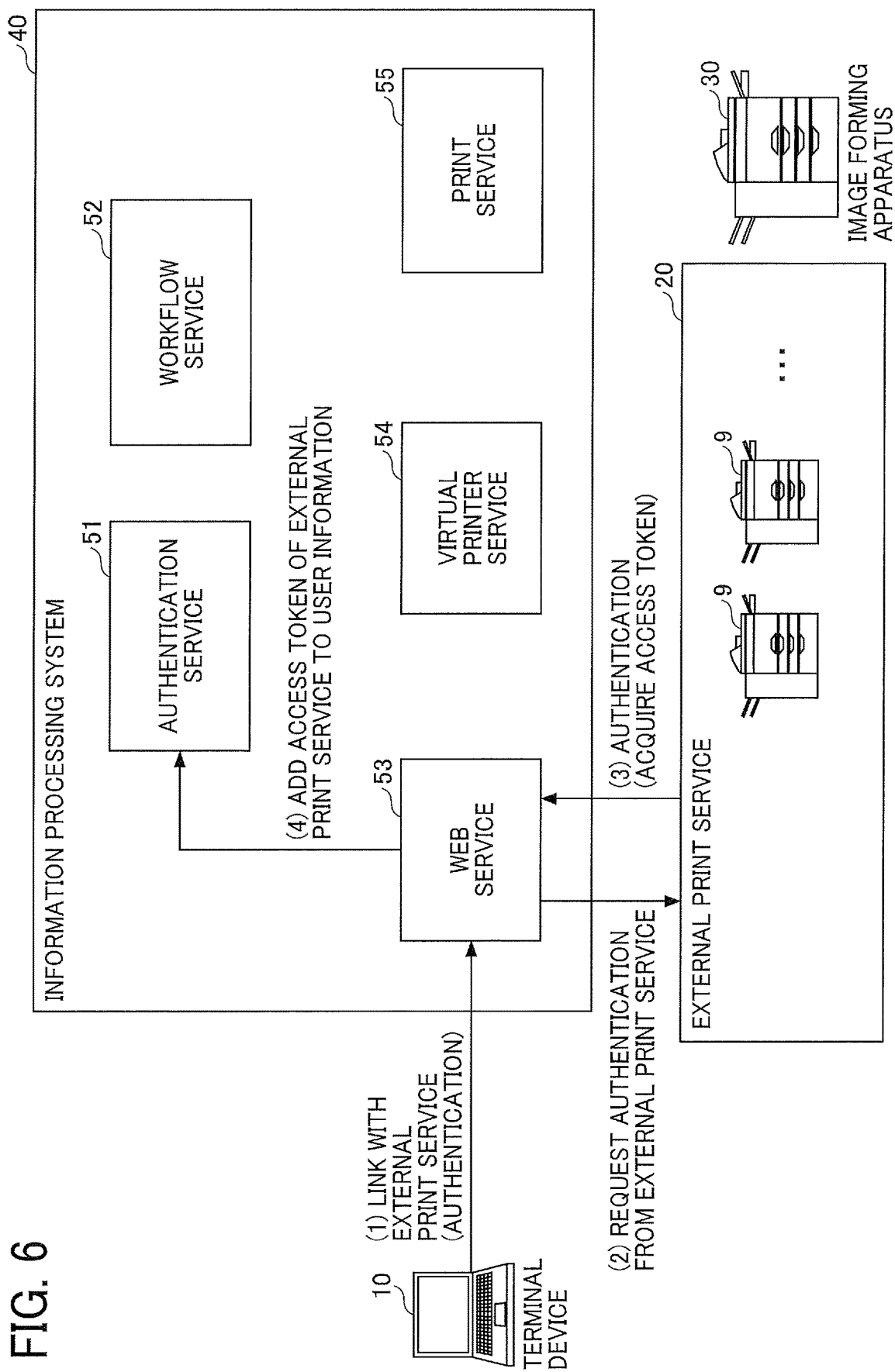
FIG. 6 is a diagram illustrating an example process of setting a link between the information processing system and the external print service.

FIG. 6 is a diagram illustrating a process of setting the link between the information processing system 40 and the external print service 20. The process of FIG. 6 is initiated by the administrator but may be initiated by a general user.

(1) Log in to the Web Service 53

The administrator sets the information processing system 40 to link with the external print service 20. From the external service link screen received from the web service 53, the administrator receives authentication and authorization of the external print service 20 by OAuth or the like and links the information processing system 40 and the external service (authentication and authorization is performed and the access token is acquired).

(2) Authentication and Authorization Request

The web service 53 requests authentication and authorization from the external print service 20. As mentioned above the administrator is authenticated and authorized, for example, by OAuth or the like. In the case of the administrator, authorization (authority for creating the virtual printer 9, etc.) is also desired.

(3) Authentication and Authorization Completed

The external print service 20 notifies the web service 53 of the completion of authorization with the external print service 20. The web service 53 acquires the access token issued by the external print service 20.

(4) The web service 53 adds the access token acquired in (3) to the user information stored in the authentication service 51 (see Table 1). As a result, the access token is stored in the user information (No. 1), and the information processing system 40 is linked with the external print service 20.

Figure 7:
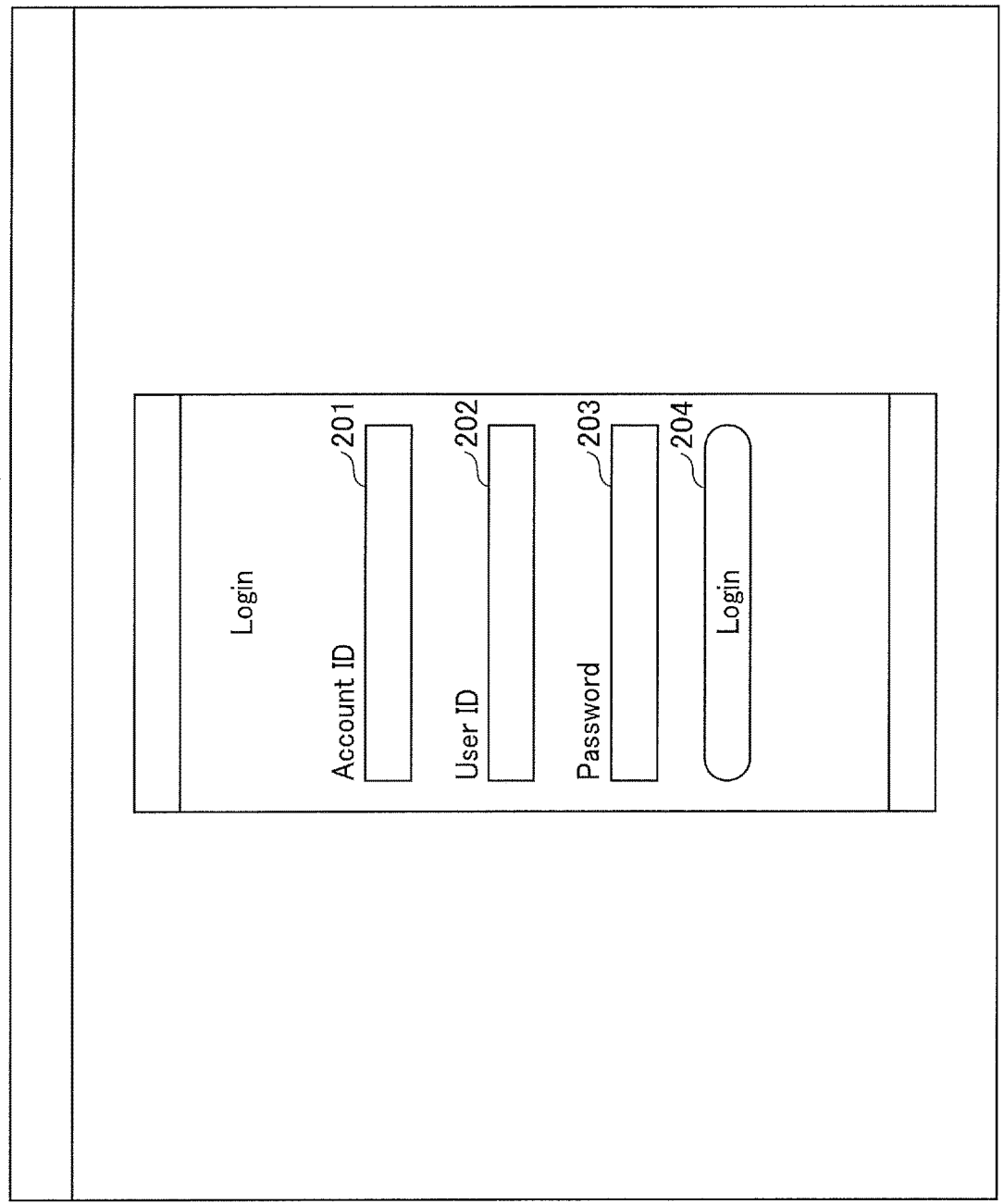
FIG. 7 is a diagram illustrating an example of a login screen displayed by the terminal device operated by an administrator.

FIG. 7 is an example of the login screen 200 displayed by the terminal device 10 operated by the administrator.

Items included in the login screen 200 is described below.

Account ID field 201 is a field to input identification information of an account of the general user or the administrator.

The user ID field 202 is a field to input identification information of the general user or the administrator.

The password field 203 is a field to input confidential information proving identity of the general user or the administrator.

Figure 8:
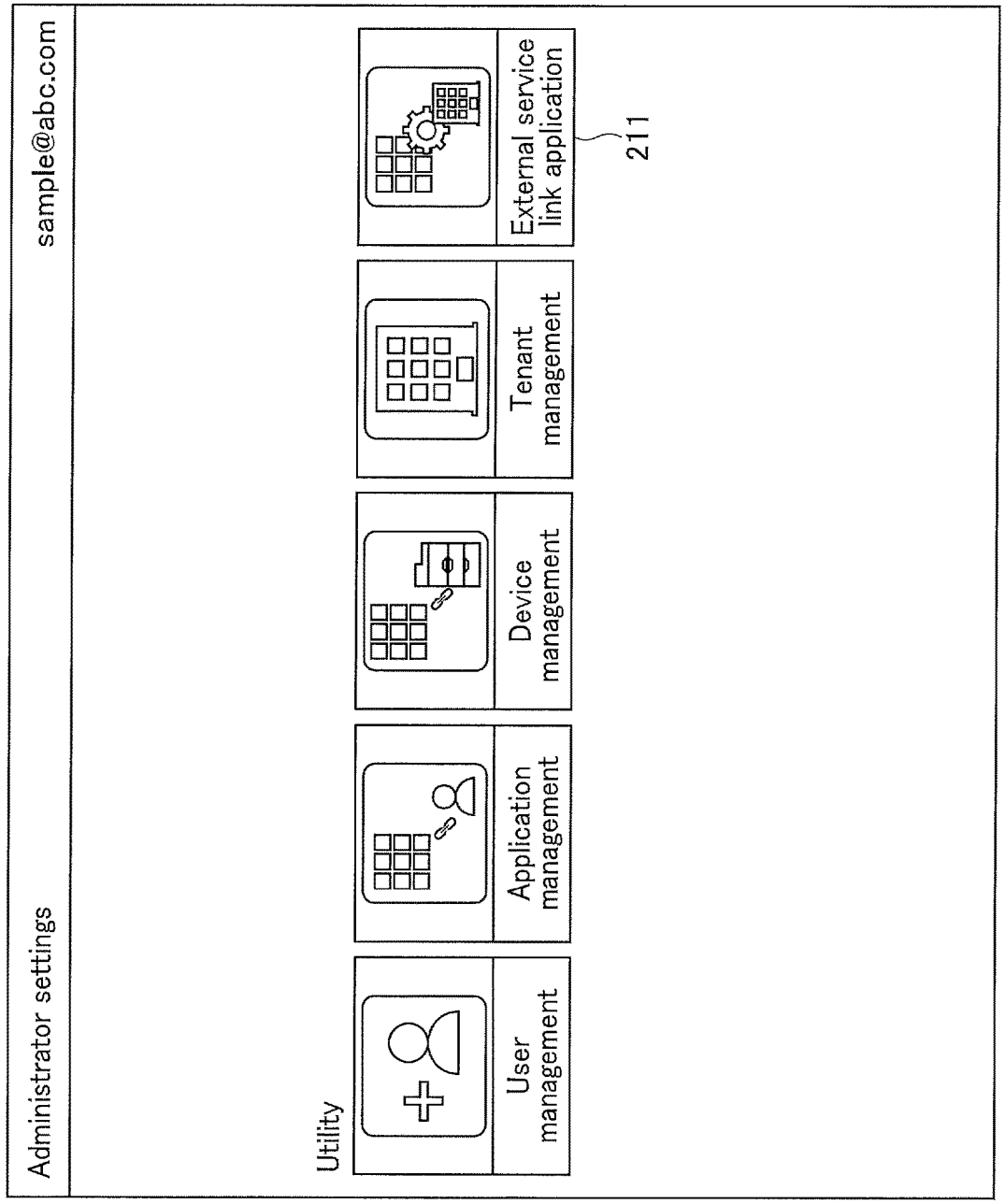
FIG. 8 is a diagram illustrating an example of an administrator setting screen displayed after login.

FIG. 8 is a diagram illustrating an example of an administrator setting screen 210 displayed after login. The administrator setting screen 210 includes an icon 211 of the external print service link application. In response to the pressing of the icon 211 of the external print service link application by the administrator, the external service link screen is displayed.

Figure 9:
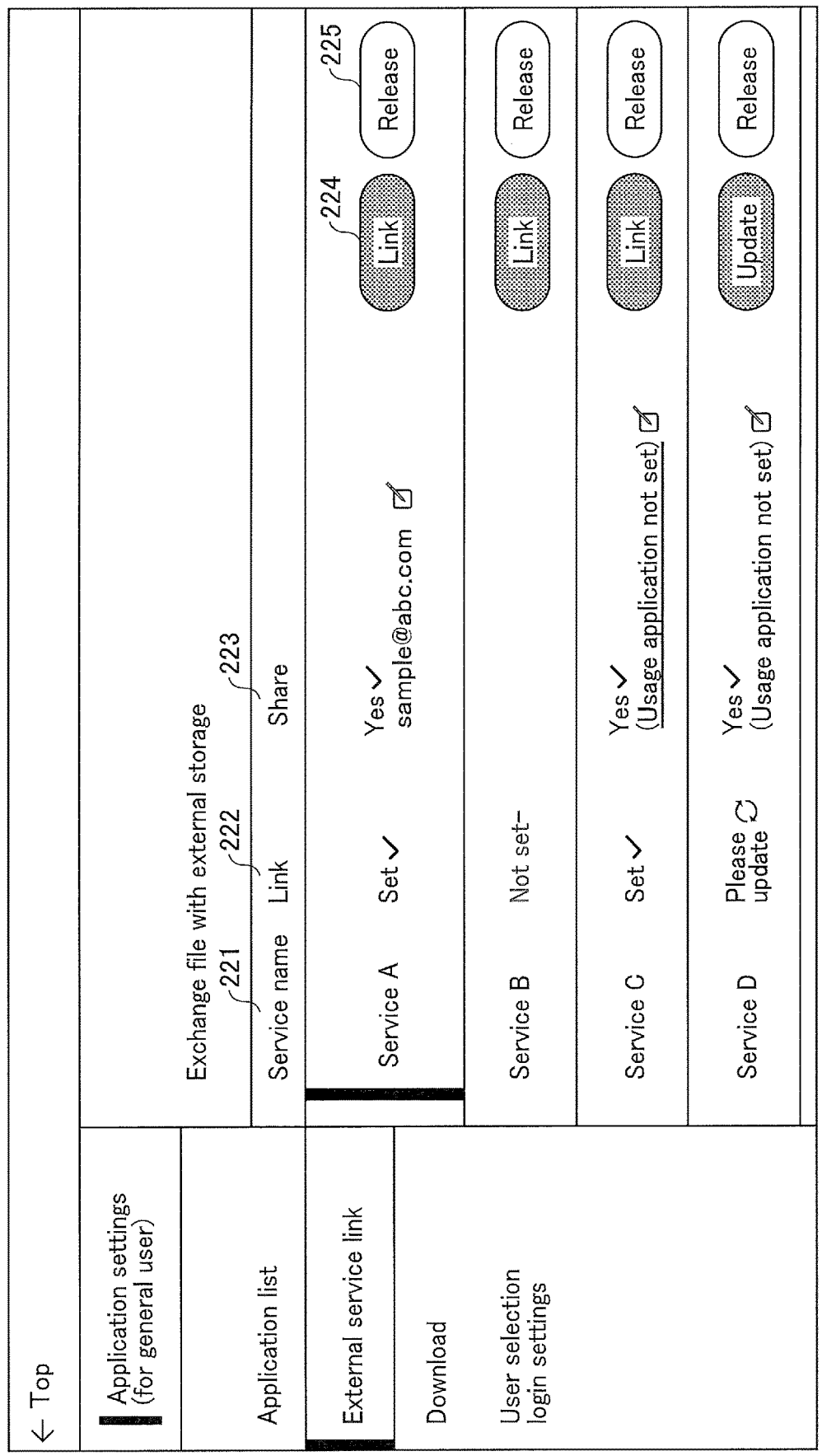
FIG. 9 is a diagram illustrating an example of an external service link screen.

FIG. 9 is a diagram illustrating an example of an external service link screen 220. The external service link screen 220 includes a service name 221, a link 222, the share 223, a link button 224, and a release button 225.

The service name 221 is the name of an external service such as the external print service 20. Although the external print service 20 is used as an example in the present embodiment, the information processing system 40 links with various external services. The external service is, for example, a storage service.

The link 222 indicates whether information (access token) for linking with the external service is set. "Please update" indicates that the access token has expired and the access token is to be renewed.

The share 223 indicates whether the external service can be shared by a plurality of users. Whether to share the external service is set on the external service link screen. In the case sharing of the external service is allowed, the information processing system 40 communicates with the external service using the user ID of the administrator, the access token, and the like.

The link button 224 is a button for the administrator to start the operation of authentication and authorization with the external service to link with the external service.

The release button 225 is a button for the administrator to cancel the link with the external service. By releasing the link, the information (access token) for the link is deleted from the user information (No. 1) in Table 1.

Figure 10:
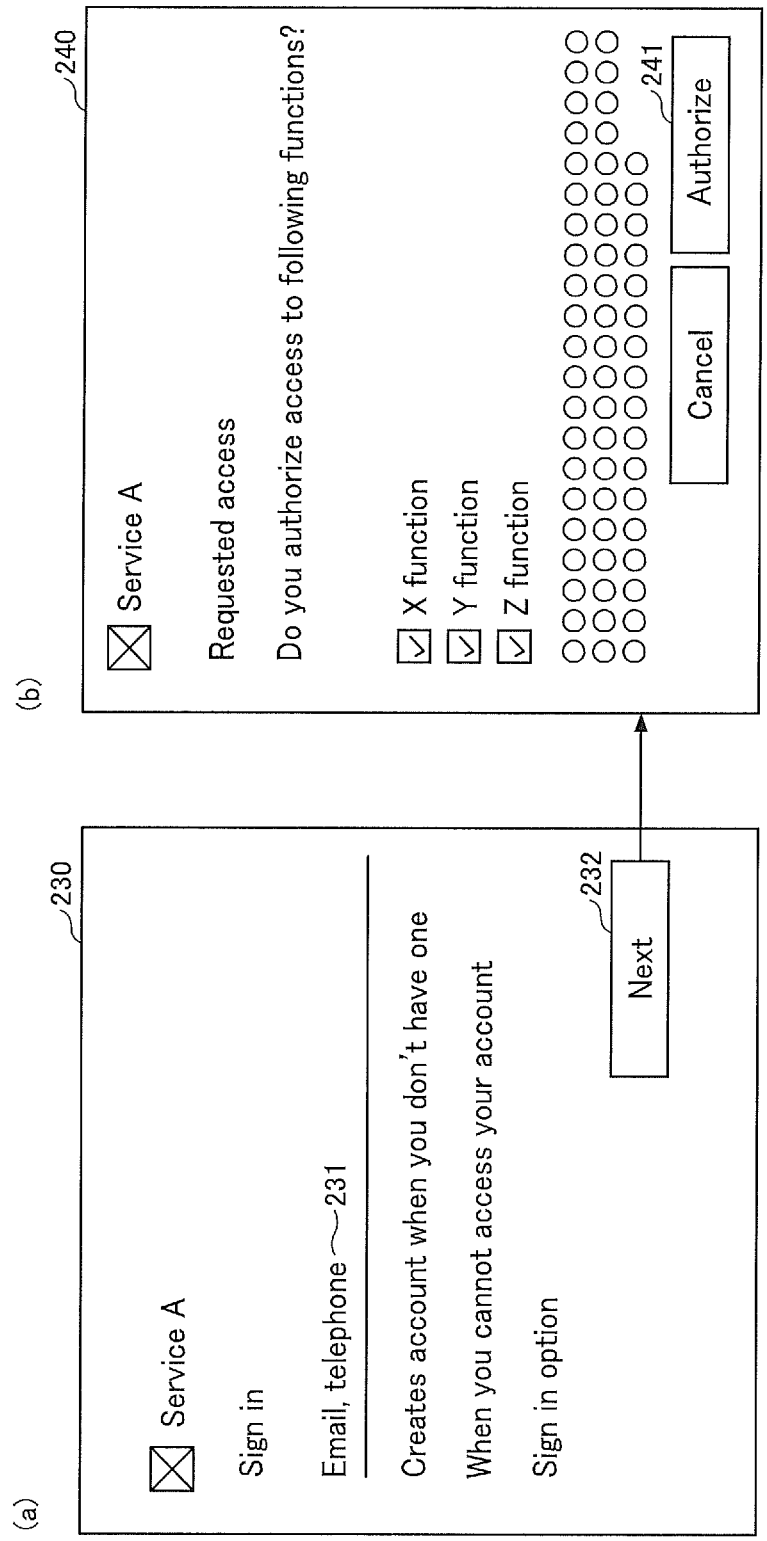
FIG. 10 is a diagram illustrating an example of an external service authentication screen and an external print service authorization screen.

FIG. 10 (*a*) is an example of an external service authentication screen 230 displayed by pressing the link button 224, and FIG. 10 (*b*) is an example of an external print service authorization screen 240.

An ID field 231 of the external service authentication screen 230 is a field in which the user inputs the user ID of the external print service 20.

The authorization screen 240 is transmitted by the authorization server, in response to an authorization request transmitted from the information processing system 40. The authorization screen 240 displays information related to the authorization request (information about client application, a list of requested authorities and the like). The administrator reviews content and decides whether to authorize or reject the authorization request. Based on authorization by the administrator, an access token is issued for which the authorization server authorized the authority.

Figure 11:
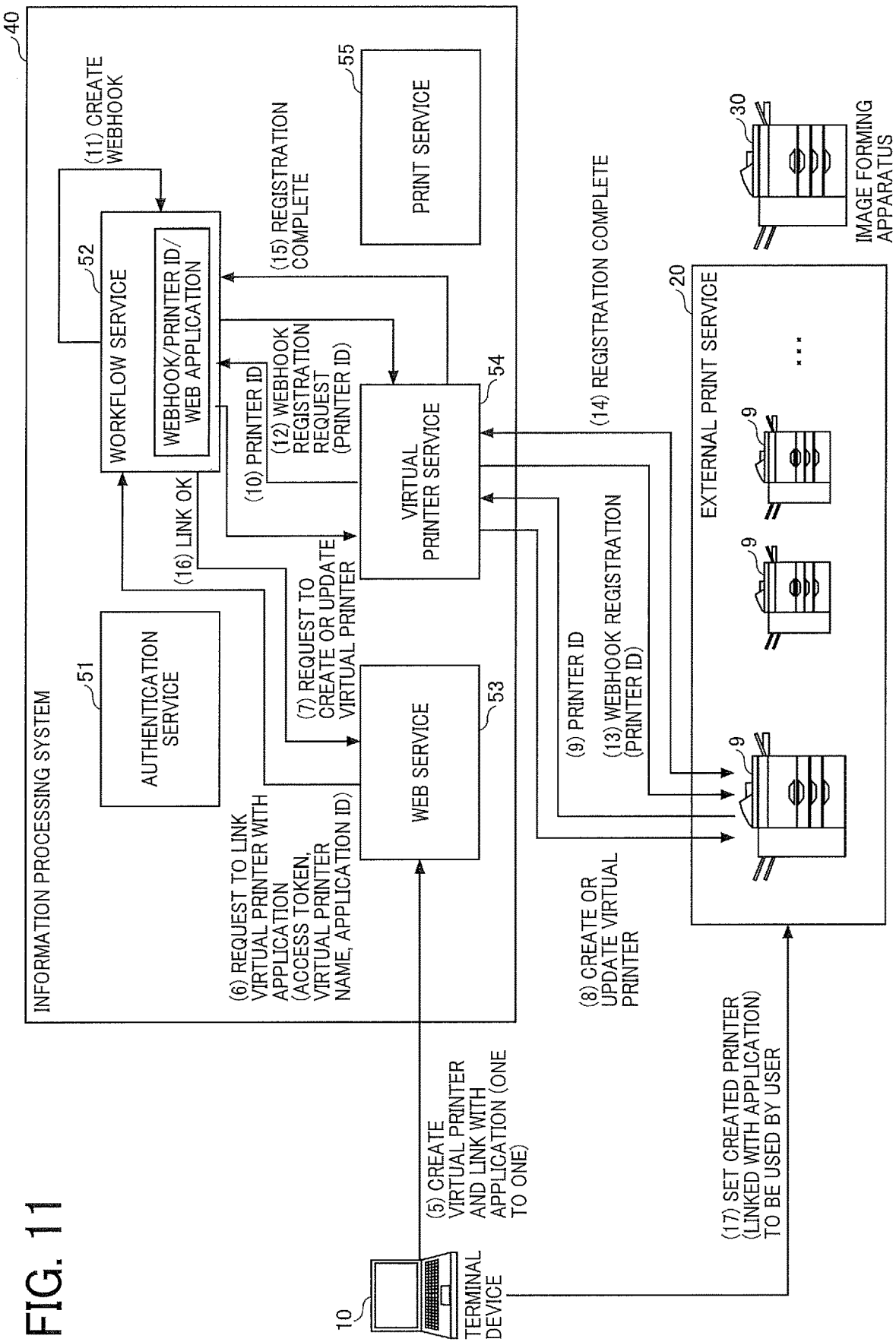
FIG. 11 is a diagram illustrating an example process in which the administrator creates a virtual printer and associates the virtual printer with an application.

With reference to FIG. 11, creation of the virtual printer 9 and association between the virtual printer 9 and the application is described. The process of FIG. 11 is initiated by the administrator but the process may be initiated by the general user.

FIG. 11 is a diagram illustrating the process in which the administrator creates the virtual printer 9 and associates the virtual printer 9 with the application.

(5) The administrator operates the terminal device 10 to create the virtual printer 9 from the external print service link application setting screen received from the web service 53 and associates the virtual printer 9 with the application. The association is one-to-one. The administrator selects the application to be associated and inputs the virtual printer name to be created on the external print service link application setting screen.

(6) The web service 53 designates the access token (held by the authentication service 51), the virtual printer name, and the application ID, and requests the workflow service 52 to associate the virtual printer 9 with the application.

(7) The workflow service 52 designates the access token and requests the virtual printer service 54 to create the virtual printer 9. Upon creation of the virtual printer 9, the workflow service 52 receives the virtual printer ID as a response.

(8) The virtual printer service 54 designates the access token and requests the external print service 20 to create the virtual printer 9. The name of the virtual printer 9 is the name set in (5).

(9) The external print service 20 returns the ID of the created virtual printer 9 to the virtual printer service 54.

(10) The virtual printer service 54 returns the printer ID of the virtual printer 9 to the workflow service 52.

(11) The workflow service 52 creates a webhook. The saving unit 25 of the workflow service 52 stores the virtual printer name acquired in (6), the application ID, and the printer ID acquired in (10) in association with the signature of the webhook (see Table 3). In response to firing of an event by the webhook, the workflow service 52 acquires the print job from the virtual printer 9.

(12) The workflow service 52 designates the printer ID and requests the virtual printer service 54 to register the webhook.

(13) The virtual printer service 54 designates the access token and the printer ID and requests the external print service 20 to register the webhook. At this time, the printer ID acquired in (10) and the access token acquired in (6) are used.

(14) The external print service 20 notifies the virtual printer service 54 of completion of webhook registration.

(15) The virtual printer service 54 notifies the workflow service 52 of the completion of webhook registration.

(16) The workflow service 52 notifies the web service 53 that the association between the application and the virtual printer 9 is completed.

(17) The administrator operates the terminal device 10 to set the virtual printer to be available to the user on a printer setting screen described below provided by the external print service 20.

FIG. 12 is an example of the external print service link application setting screen 250. Items included in the screen are described below.

An application field 251 displays, for example, a pull-down menu of a list of applications set in advance in the information processing system 40 that executes a series of processes. The application selected in the application field 251 is to be associated with the virtual printer 9.

A printer name field 252 is for the administrator to set a name of the virtual printer 9.

Default print setting field 253 is for the administrator to set initial values of the print settings.

FIG. 13 is an example of the external printer setting screen 260. A list of virtual printers 9 is displayed on the external printer setting screen 260.

A name 261 indicates the printer name of the virtual printer 9.

Status 262 indicates the status of the virtual printer 9 (printable, error occurred, etc.).

Share status 263 indicates the status of sharing of the virtual printer 9.

A share name 264 indicates a name to identify the virtual printer 9, such as an installation location.

The administrator selects the printer name of the virtual printer 9 in the name 261 and sets the status of the virtual printer 9 to be printable in the status 262. Such a setting is a setting to make the virtual printer available to the user. The share status 263 and the share name 264 may be set.

Figure 14:
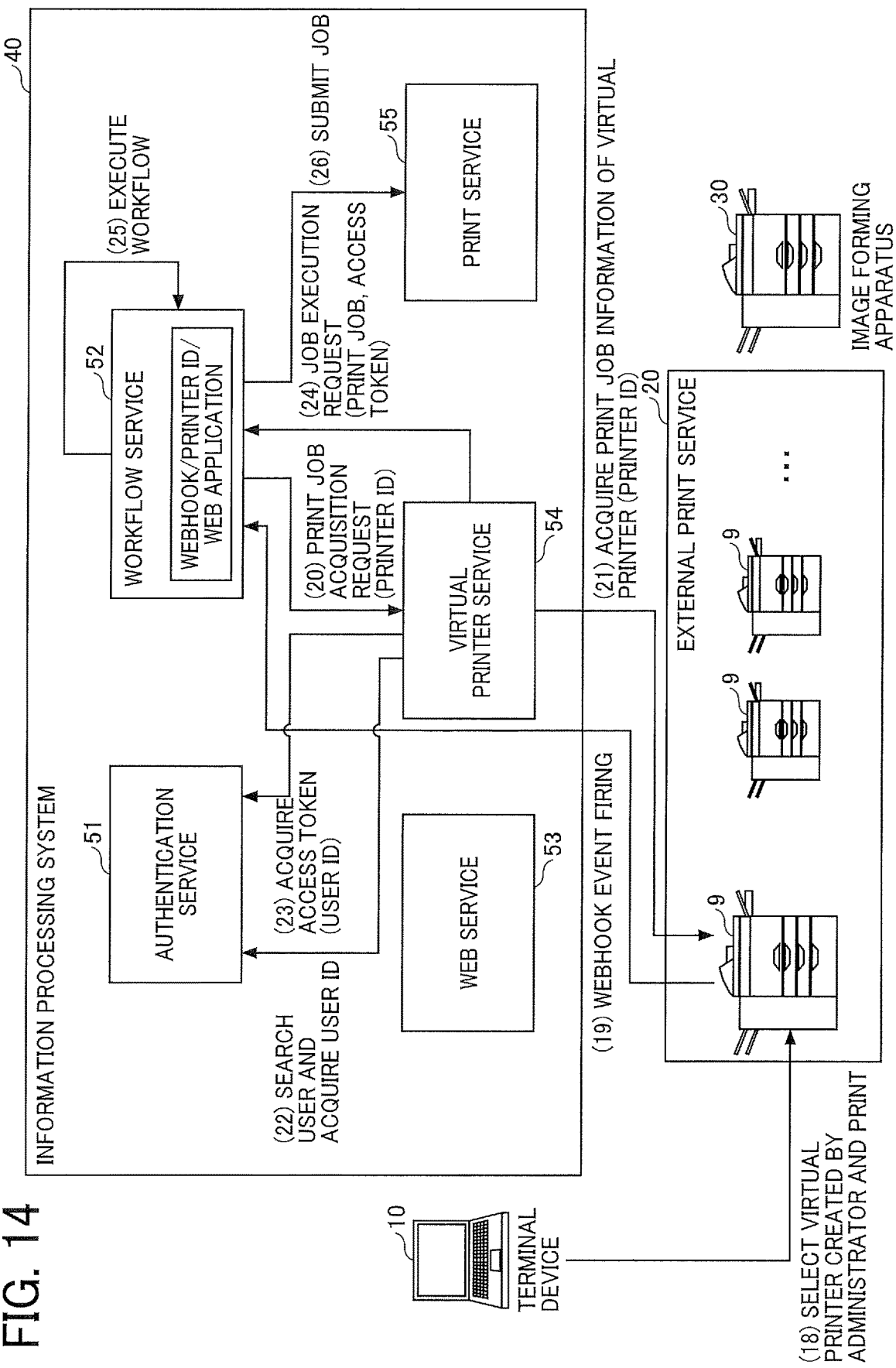
FIG. 14 is a diagram illustrating an example process in which a user executes an application through an external print service.

With reference to FIG. 14, a process in which the user requests the external print service 20 to execute printing is described. The administrator and the user do not have to be different persons, and the administrator who registered the virtual printer 9 may print. In this case, the administrator is the general user. That is, the association information between the virtual printer 9 and the application set by the user may not be shared with other users.

FIG. 14 is a diagram illustrating the process initiated by the user to execute the application through the external print service 20.

(18) The virtual printer 9 created by the administrator is selected on the print screen described below and the user inputs the print operation to the image forming apparatus 30. The user logs in to the external print service 20 with his or her own account (user ID and password, etc.). In the external print service 20, the printer ID corresponding to the virtual printer 9 and the print job are associated with each other.

(19) The external print service 20 detects firing of the event of the webhook registered in the virtual printer 9 and transmits the URL of the webhook to the workflow service 52. The application is identified by collating the signature of the webhook and the signature of the application information on the workflow service described above. (For example, "fjp23jtij3ahi34ht3ihihag834hgiah34" at the end of https://www.dev.smart-integration.ricoh.com/vl/appdata/webhook/fjp23jtij3ahi34ht3ihihag834hgiah34 in the above example.) Alternatively, the external print service 20 may transmit the URL of the webhook and the print job to the workflow service 52.

(20) Based on the URL of the webhook, the workflow service 52 processes using the access token (see Table 1) of the administrator who registered the webhook without additional authentication. The workflow service 52 uses the printer ID associated with the signature in Table 3. The workflow service 52 designates the access token and the printer ID and requests the virtual printer service 54 to acquire the print job.

The virtual printer service 54 is not allowed to acquire the jobs (in the external print service) of all the general users in the tenant unless the print management authority on the external print service is used. In the case the print management authority is not used, following inconvenience may be considered. Firstly, the virtual printer service 54 repeatedly acquire jobs for all general users, and the number of accesses increases, and secondly, all jobs are not allowed to be viewed unless all general users are linked with the external print service 20.

(21) The virtual printer service 54 is authenticated by the access token of the administrator, and acquires from the external print service 20, the information related to the print job transmitted to the virtual printer 9. Information related to the print job is illustrated in FIGS. 16A and 16B.

(22) The virtual printer service 54 transmits the user ID in the print job acquired in (21) to the authentication service 51. The authentication service 51 refers to the user information (No. 2) in Table 2, searches for the user ID in the print job, and identifies which user of the information processing system 40 requested printing. This is because the job execution is executed as a general user of the information processing system 40, and the job is managed as a job executed by the general user.

(23) The virtual printer service 54 acquires an access token of the user (access token in Table 2) for executing the application from the authentication service 51 using the user ID acquired in (22). That is, since the user has logged in to the external print service 20 but has not logged in to the information processing system 40, the virtual printer service 54 acquires the access token of the user.

(24) The virtual printer service 54 requests the workflow service 52 to execute the print job by using the access token acquired in (23). The application is executed using the acquired access token of the general user. This enables to limit the users who can download the accumulated print jobs with the image forming apparatus to this general user.

(25) The processing unit 33 of the workflow service 52 executes a flow (a series of processing) by using the application ID stored in (11) and the print job acquired in (24) by the administrator. In other word, the workflow service 52 performs an additional processing.

In the present embodiment, an example in which the workflow service 52 inputs the print job to the print service 55 and prints from the image forming apparatus is described, but since the general user is identified by the access token, the following flow is also possible.

Send a print job to the email address set by the user without printing by the user. (In the case the general user is not designated, the workflow service 52 sends the email to the same address regardless of which user belonging to the same tenant submits the print job).

Store the print job in the cloud storage service set by the general user without printing by the user.

(26) The workflow service 52 submits to the print service 55, the print job for which additional processing has been executed. The print service 55 stores the print job in the storage unit 31 in association with the access token.

The process of transmitting from the workflow service 52 to the print service 55 in (26) changes depending on what kind of application the virtual printer 9 is associated with. The process of (26) may not be performed.

Figure 15:
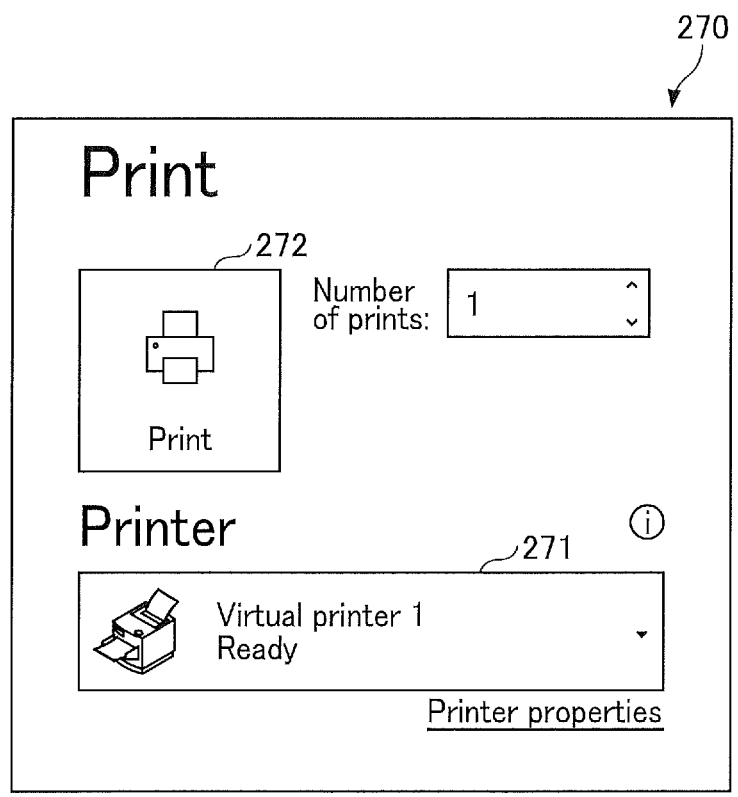
FIG. 15 is a diagram illustrating an example of a print screen displayed by the terminal device.

FIG. 15 is a diagram illustrating an example of a print screen 270 displayed by the terminal device 10. The print screen 270 includes a printer selection field 271. The virtual printer 9 registered in the external print service 20 set on the external printer setting screen 260 is displayed in the printer selection field 271. The user selects the virtual printer 9 (associated flow can be known) sent by the administrator by email or the like, or the virtual printer 9 or the like described in the manual. In response to the pressing of the print button 272 by the general user, the terminal device 10 sends the print job to the external print service 20.

FIGS. 16A and 16B are diagrams illustrating the user ID included in the print job. In the example of FIG. 16A, userPrincipalName 281 is a user ID logged in to the external print service 20. The virtual printer service 54 requests the user ID (user ID in Table 2) stored by the authentication service 51 to be searched by the user ID in FIGS. 16A and 16B. In the case the user ID matches the search, the virtual printer service 54 acquires an access token associated with the user ID stored by the authentication service 51 from the authentication service 51.

In FIGS. 16A and 16B, the user ID is an email address, but the user ID may be any combination of characters, numbers, alphabets, and symbols.

Further, in the present embodiment, the user IDs of the information processing system 40 and the external print service 20 are the same. Alternatively, by providing a table for associating the user ID of the information processing system 40 with the user ID of the external print service 20 in advance in the authentication service 51, the user IDs of the information processing system 40 and the external print service 20 may not be the same. Further, the external print service 20 may perform a conversion process between the user ID of the information processing system 40 and the user ID of the external print service 20.

In the case the user of the information processing system 40 is not identified by the information illustrated in FIG. 16A, the information processing system 40 acquires the information that identifies the user (general user) by using a user information acquisition Application Programming Interface (API) of the general user on the external print service 20.

FIG. 16B is an example of the user information acquired by using the user information acquisition API of the general user on the external print service 20. API is a specification of an interface used by software components to exchange information with each other.

The email address of the general user (registered in the external print service 20) or the user ID of the general user (external print service 20) acquired by the information processing system 40 is used as a key. The workflow service 52 passes the key to the user information acquisition API (authentication service of the information processing system 40) and acquires the user ID ("uuid") 282 of the general user from the response.

With reference to FIG. 17, a process in which the user operates the image forming apparatus 30 to execute printing is described. FIG. 17 is a diagram illustrating the process in which the user operates the image forming apparatus 30 to execute printing.

(30) The user logs in to the image forming apparatus 30. In addition to the login method using the email address and user ID, login method using an integrated circuit (IC) card or the like may be used.

(31) The image forming apparatus 30 transmits an authentication request to the authentication service 51.

(32) In response to a successful authentication, the authentication service 51 returns the access token of this user to the image forming apparatus 30.

(33) The image forming apparatus 30 uses the access token acquired from the print service 55 to acquire the print job list associated with the access token from the storage unit 31.

(34) In response to a selection of a print job by the user, the image forming apparatus 30 receives the print job from the print service 55 and executes the print job.

Based on the above description, the process from the registration of the virtual printer 9 to the submission of the print job is described with a sequence diagram.

Figure 18A:
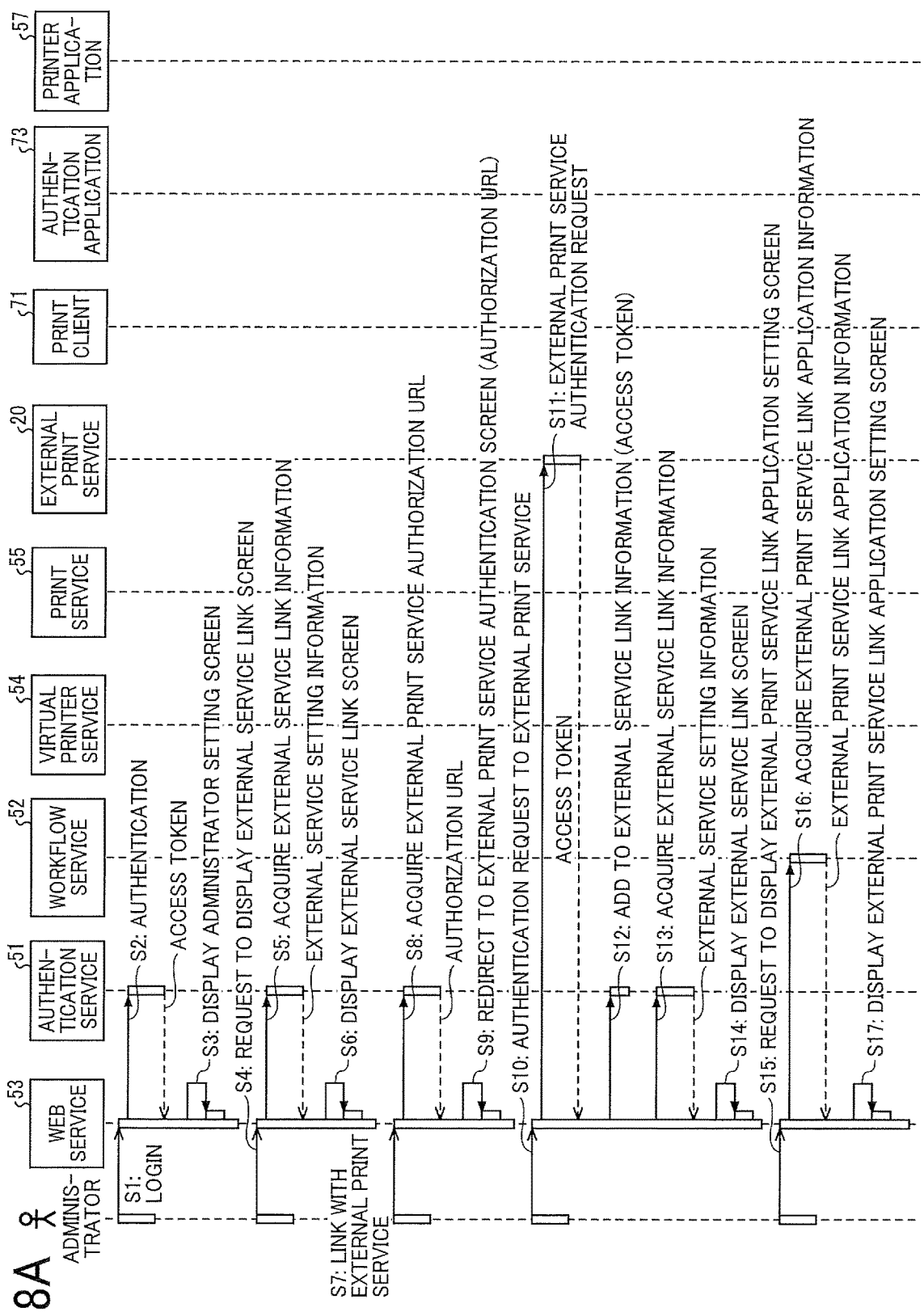
FIGS. 18A and 18B are a sequence diagram illustrating an example of a process in which the virtual printer and the application are associated.
Figure 18B:
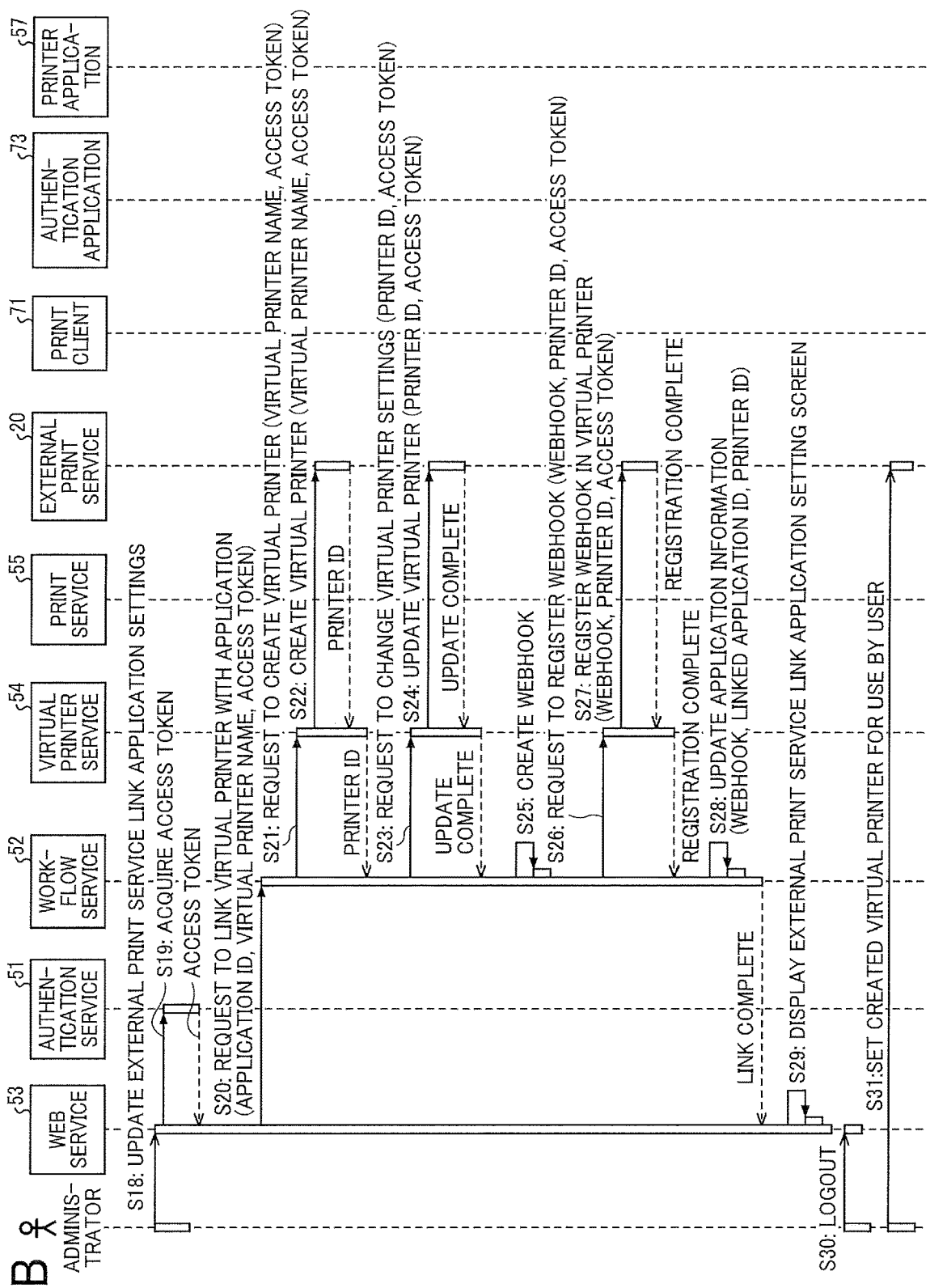

FIGS. 18A and 18B are an example of a sequence diagram illustrating a process in which the administrator associates the virtual printer 9 with the application. The process of FIGS. 18A and 18B is initiated by the administrator, but the process may be initiated by the general user.

Note that although the communication between the services in the information processing system 40 is performed by each communication unit, the processing of the communication unit is omitted in the description of the process.

In step S1, in response to the input of the authentication information (account ID, user ID, password) on the login screen 200 and pressing of the login button 204 by the administrator, the communication unit 61 of the terminal device 10 transmits the authentication information to the web service 53.

In step S2, the communication unit 26 of the web service 53 receives the authentication request, transmits the authentication information to the authentication service 51, and requests the authentication. Based on a successful login, the access token of the information processing system 40 of the administrator is returned.

In step S3, in response to the successful login, the screen display unit 28 of the web service 53 generates the administrator setting screen 210, and the communication unit 26 transmits the screen information of the administrator setting screen 210 to the terminal device 10.

In step S4, the communication unit 61 of the terminal device 10 receives the screen information of the administrator setting screen 210, and the display control unit 62 displays the administrator setting screen 210. Then, the administrator presses the icon 211 of the external service link application. The operation reception unit 63 of the terminal device 10 receives the pressing of the icon 211, and the communication unit 61 transmits a display request of the external service link screen 220 to the web service 53.

In step S5, the communication unit 26 of the web service 53 receives the display request of the external service link screen 220, and the communication unit 26 acquires the setting information of the external service associated with the administrator from the authentication service 51.

In step S6, the screen display unit 28 of the web service 53 generates the external service link screen 220 based on the setting information of the external service, and the communication unit 26 transmits the screen information of the external service link screen 220 to the terminal device 10.

In step S7, the communication unit 61 of the terminal device 10 receives the screen information of the external service link screen 220, and the display control unit 62 displays the external service link screen 220. The external print service 20 is authorized on this screen. The administrator presses the link button 224 for the web service 53 to link with the external print service 20. The operation reception unit 63 receives the pressing of the button. The communication unit 61 of the terminal device 10 requests the web service 53 to link with the external print service 20.

In step S8, the communication unit 26 of the web service 53 receives a request to link with the external print service 20 and acquires an authorization URL of the external print service 20 from the authentication service 51. The authorization URL is a redirect destination of OAuth.

In step S9, the web service 53 redirects the terminal device 10 to the authorization URL of the external print service 20. As a result, the display control unit 62 of the terminal device 10 displays the external service authentication screen 230 and the authorization screen 240.

In step S10, the administrator inputs the user ID of the external print service 20 on the external service authentication screen 230 and presses the authorization button 241 on the authorization screen 240. The operation reception unit 63 receives the pressing of the button. The communication unit 61 of the terminal device 10 requests the web service 53 for the authorization and authentication with the external print service 20.

In step S11, the web service 53 requests the authentication and authorization from the external print service 20 and acquires the access token of the administrator for the external print service 20.

In step S12, the communication unit 26 of the web service 53 requests the authentication service 51 to add the access token acquired in S11 to the user information.

In step S13, the web service 53 requests the setting information of the external service from the authentication service 51 in order to update the external service link screen.

In step S14, the screen display unit 28 of the web service 53 generates the external service link screen 220 using the setting information of the external service and transmits the screen information to the terminal device 10.

In step S15, the communication unit 61 of the terminal device 10 receives the screen information of the external service link screen 220, and the display control unit 62 displays the external service link screen 220. The external print service 20 authorized in step S11 is displayed as "set" in the link 222.

Then, the administrator inputs an operation for displaying the external print service link application setting screen 250 to the terminal device 10. The communication unit 61 of the terminal device 10 requests the external print service link application setting screen 250 from the web service 53.

In step S16, the communication unit 26 of the web service 53 receives the request for the external print service link application setting screen 250. The communication unit 26 acquires information (application list, setting items, etc.) of the external print service link application from the workflow service 52.

In step S17, the screen display unit 28 of the web service 53 generates the external print service link application setting screen 250 based on the information acquired in step S16 and the communication unit 26 transmits the screen information to the terminal device 10.

In step S18, the communication unit 61 of the terminal device 10 receives the screen information of the external print service link application setting screen 250 and the display control unit 62 displays the external print service link application setting screen 250. Then, the administrator selects an application, inputs the virtual printer 9, and presses the "save" button 254 for requesting an update of the external print service link application setting. The operation reception unit 63 of the terminal device 10 receives the pressing, and the communication unit 61 sends an update request for the external print service link application setting to the web service 53.

In step S19, the communication unit 26 of the web service 53 receives the update request of the external print service link application setting and requests the authentication service 51 to acquire the access token (issued by the external print service 20).

In step S20, the web service 53 requests the creation of the virtual printer 9 by transmitting a request for associating the virtual printer 9 with the application (application ID, virtual printer name, access token) to the workflow service 52.

In step S21, the workflow service 52 designates the virtual printer name and the access token and requests the virtual printer service 54 to create the virtual printer 9.

In step S22, the communication unit 29 of the virtual printer service 54 designates the virtual printer name and the access token and requests the external print service 20 to create the virtual printer 9. In response to a successful creation of the virtual printer, the virtual printer service 54 and the workflow service 52 acquire the printer ID.

In step S23, the workflow service 52 designates the printer ID and the access token and requests the virtual printer service 54 to change settings of the virtual printer 9.

In step S24, the virtual printer service 54 designates the printer ID and the access token and requests the external print service 20 to update the virtual printer 9. In other words, after the virtual printer is created, the virtual printer service 54 updates the settings so that the virtual printer is available to the user. This update may not be performed.

In step S25, the saving unit 25 of the workflow service 52 creates a webhook (numbering a signature that becomes the URL) and stores the signature and the application ID in the application information in Table 3 in association with each other.

In step S26, the workflow service 52 designates the URL of the webhook, printer ID, and access token, and requests the virtual printer service 54 to register the webhook in the external print service 20.

In step S27, the virtual printer service 54 is authenticated by the access token, designates the URL of the webhook and the printer ID, and requests the external print service 20 to register the webhook in the virtual printer 9. In response to a successful creation of the virtual printer, the virtual printer service 54 and the workflow service 52 acquire a notification of successful registration.

In step S28, the workflow service 52 updates the application information in Table 3 in association with the URL (signature) of the webhook, the application ID, and the printer ID.

In step S29, in response to completion of the webhook registration to the external print service 20 in step S27, the screen display unit 28 of the web service 53 regenerates the external print service link application setting screen 250 and the communication unit 26 transmits the screen information to the terminal device 10. The display control unit 62 of the terminal device 10 displays the printer name registered in the printer name field 252. Further, the display control unit 62 may display the completion of webhook registration and the like.

In step S30, the administrator logs out from the information processing system 40.

In step S31, the administrator operates the terminal device 10 to connect the terminal device 10 to the external print service 20. The terminal device 10 displays the external printer setting screen 260, and the administrator sets the external print service 20 to make the virtual printer 9 created in step S22 available to the user.

Figure 19A:
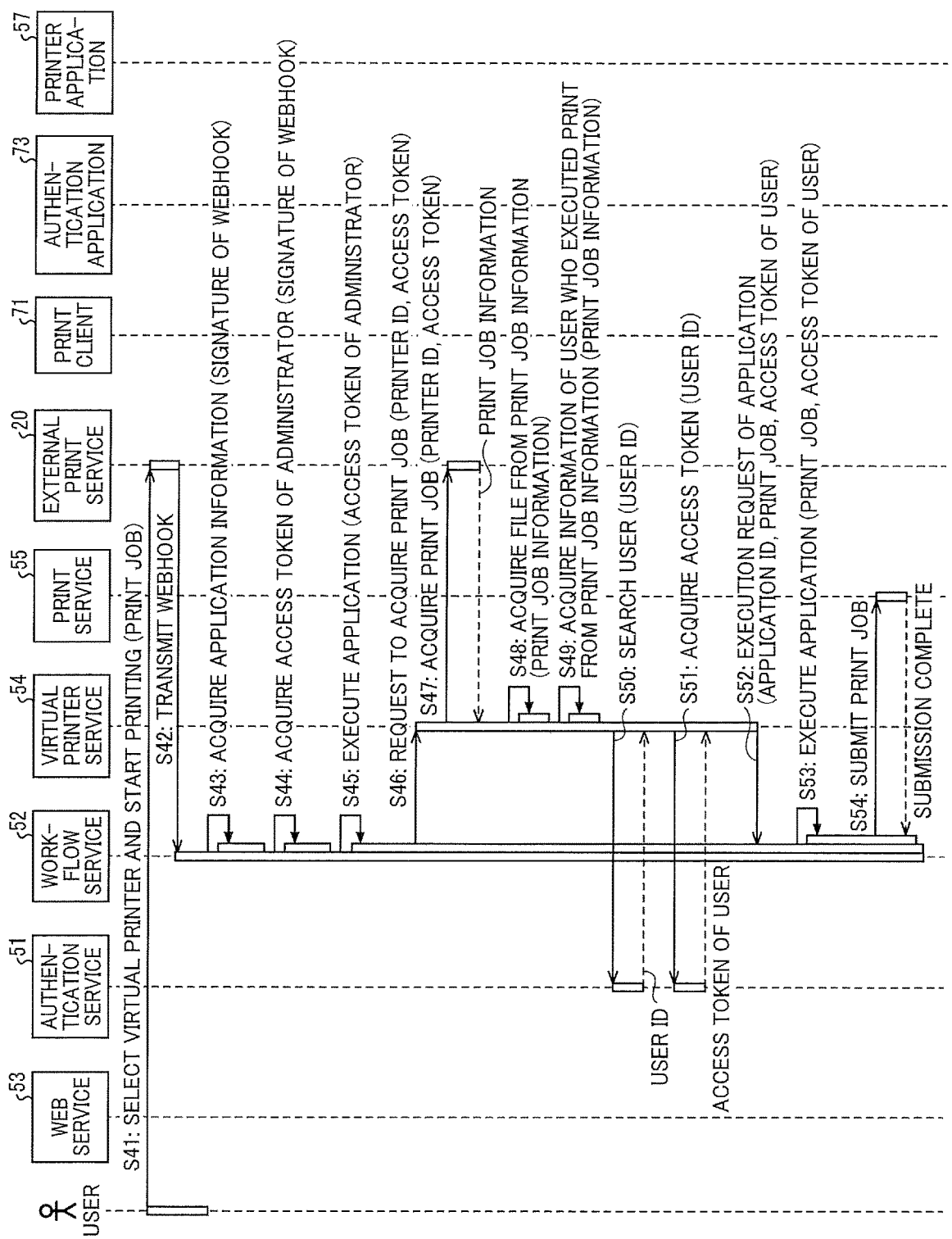
FIGS. 19A and 19B are a sequence diagram illustrating an example of a process in which the user requests the external print service to execute the print job and the information processing system executes the application associated with the virtual printer.
Figure 19B:
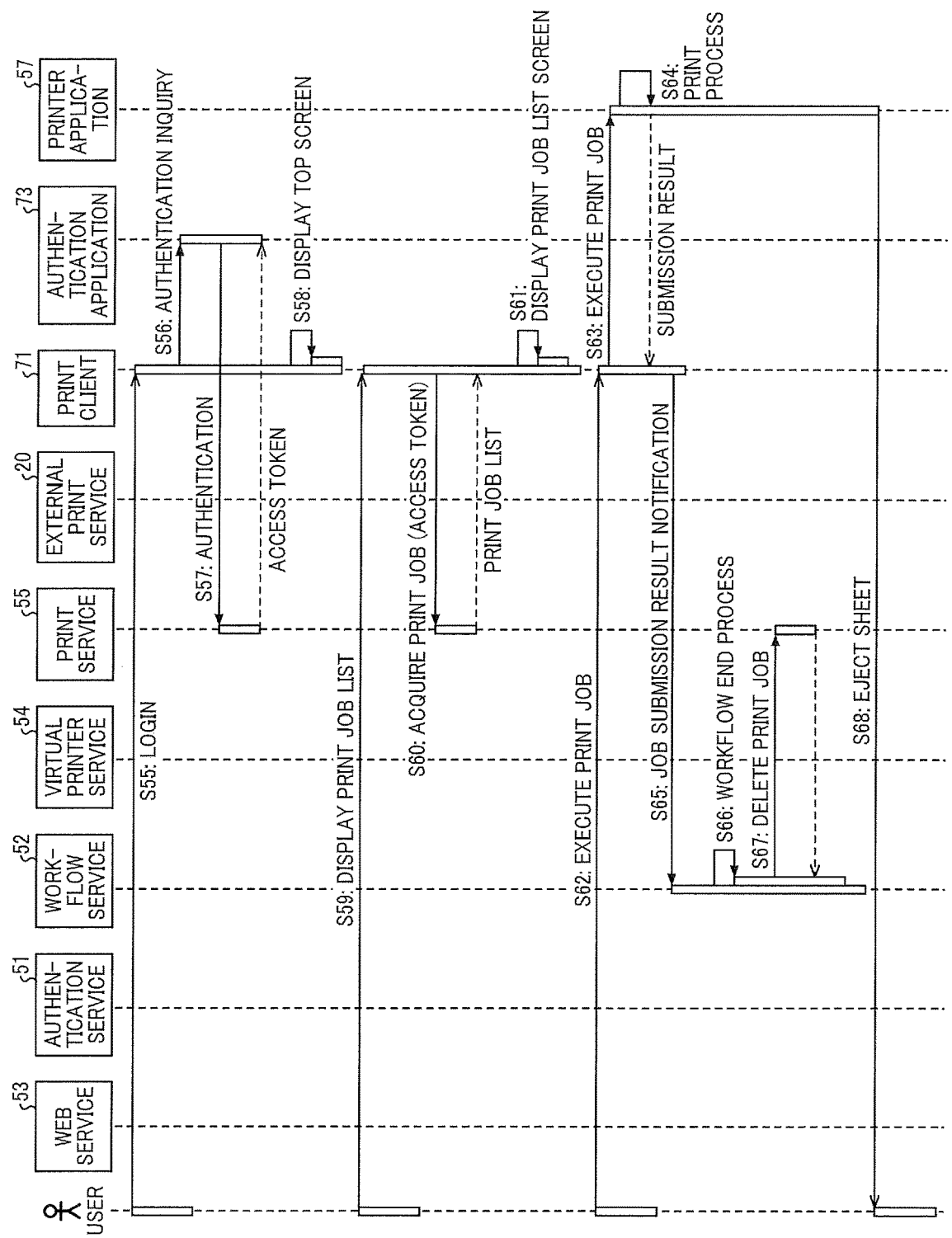

FIGS. 19A and 19B are a sequence diagram illustrating an example of a process in which the user requests the external print service 20 to execute the print job and the information processing system 40 executes the application associated with the virtual printer 9.

In step S41, the user operates the terminal device 10 to connect the terminal device 10 to the external print service 20. On the print screen 270, the user selects the virtual printer 9 instructed by the administrator or a manual to execute printing. In the execution of printing, since the terminal device 10 connects to the external print service 20 with the web browser, a PDF file or the like is selected by the web browser, and the print function of the web browser is used.

In step S42, in response to receiving of the print request by the virtual printer 9 of the external print service 20, the communication unit 11 of the external print service 20 notifies the information processing system 40 of the event firing of the webhook associated with the virtual printer. In other words, the communication unit 11 of the external print service 20 notifies the information processing system 40 of the URL of the webhook. The communication unit 11 of the external print service 20 may notify the information processing system 40 of the URL of the webhook and the print job at this timing. In this case, the printer ID and the application ID may not be associated with each other in Table 3.

In step S43, the workflow service 52 refers to the application information in Table 3 and acquires information (application ID, printer ID) for linking with the external print service 20 from the signature included in the URL of the webhook.

In step S44, the workflow service 52 identifies a webhook registrant (administrator in the present embodiment) associated with the webhook signature in the application information in Table 3. Then, the workflow service 52 acquires the access token (issued by the external print service 20) associated with the user ID of the administrator from the user information (No. 1) in Table 1.

In step S45, the workflow service 52 starts execution of the application linked with the external print service 20.

In step S46, the workflow service 52 designates the printer ID and the access token of the external print service 20 and sends a print job acquisition request to the virtual printer service 54.

In step S47, the virtual printer service 54 being authenticated by the access token of the external print service 20, designates the printer ID and requests the external print service 20 to acquire the print job. The file and the information of the user who executed the print are acquired from the print job acquired here.

In step S48, the virtual printer service 54 acquires a file from the print job acquired in step S47.

In step S49, the virtual printer service 54 acquires user information (user ID in the external print service 20) from the print job acquired in step S47.

In step S50 the virtual printer service 54 requests the authentication service 51 to search the user information (No. 2) in Table 2 for the same user ID as the user ID acquired in step S47. This is for the virtual printer service 54 to acquires the access token of the user in the information processing system 40.

In step S51, the virtual printer service 54 designates the user ID searched in step S50 and acquires the access token (issued by the information processing system 40) associated with this user ID (user ID in Table 2) in the user information (No. 2) in Table 2 of the authentication service 51.

In step S52, the virtual printer service 54 designates the application ID, the print job, and the access token of the user, and requests the workflow service 52 to execute the application.

In step S53, the processing unit 33 of the workflow service 52 designates the print job and the access token of the user (issued by the information processing system 40) and starts executing the application. Since the application includes at least one process, the information processing system 40 can add a process other than printing to the print job.

In step S54, the workflow service 52 submits the print job to the print service 55. The print service 55 stores the access token and the print job in association with each other in the storage unit 31. In the case the application does not include the print process, step S54 is not executed, and for example, an email is sent to the user or a person designated by the user or is sent to the cloud storage.

In step S55, the user operates the image forming apparatus 30 to log in to the print client 71.

In step S56, the print client 71 requests authentication from the authentication application 73.

In step S57, the authentication application 73 requests the authentication service 51 for authentication. In response to a successful authentication, the authentication application 73 acquires an access token (issued by the information processing system 40) used for acquiring the print job or the like.

In step S58, the print client 71 displays a top screen after login.

In step S59, the user inputs an operation for displaying the print job list to the print client 71.

In step S60, the print client 71 acquires the print job list from the print service 55 by using the access token of the user acquired in step S57.

In step S61, the print client 71 displays the print job list screen on the control panel.

In step S62, the user selects the print job and requests the print client 71 to execute the print job.

In step S63, the print client 71 requests the print application 72 to execute printing.

In step S64, the print application 72 acquires the designated print job from the information processing system 40 and performs the print process.

In step S65, the communication unit 41 of the print client 71 notifies the workflow service 52 that the print job is submitted.

In step S66, the communication unit 23 of the workflow service 52 receives a notification stating that the print job has been submitted, and the workflow service 52 performs a termination process of the application.

In step S67, the workflow service 52 requests the print service 55 to delete the print job printed in step S64.

In step S68, the print application 72 ejects paper on which the print job is printed.

As described above, in the present embodiment, the information processing system 40 creates the virtual printer 9 in the external print service 20, and in the information processing system 40, the virtual printer 9 and the application provided by the information processing system 40 are associated with each other. In response to the user request to the external print service 20 to print using the virtual printer 9, the information processing system 40 processes the print job in the web application. Since one or more processes for the print job are defined in the web application, the printing system can add the process to the print job.

In a second embodiment, a printing system in which the administrator can associate an application with the existing virtual printer 9 is described.

In the second embodiment, the hardware configuration illustrated in FIGS. 3 and 4 and the functional configuration illustrated in FIG. 5 described in the above embodiment are applicable.

In the present embodiment, the external print service link application setting screen 250 is different from that of the first embodiment.

Figure 20:
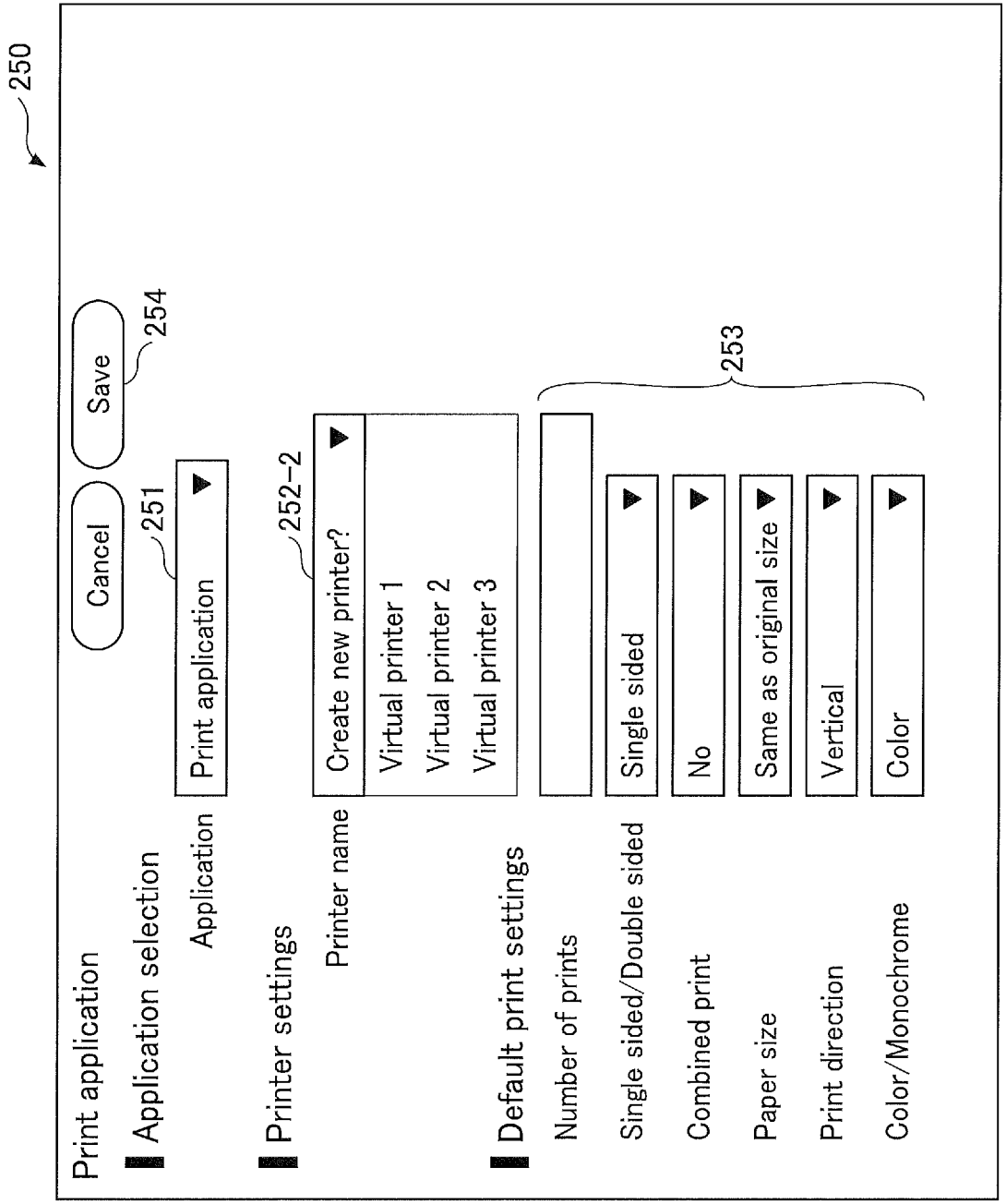
FIG. 20 is a diagram illustrating an example of an external print service link application setting screen according to a second embodiment of the present disclosure.

FIG. 20 is a diagram illustrating an example of the external print service link application setting screen 250 according to the second embodiment of the present disclosure.

In the description of FIG. 20, difference from FIG. 12 is mainly described. In the present embodiment, the printer name field 252-2 is different.

In the printer name field 252-2 of the present embodiment, in addition to the administrator setting any name on the virtual printer 9, the virtual printer 9 already registered is displayed by, for example, a pull-down menu. As a result, the administrator can associate the application with the existing virtual printer 9.

In the printer name field 252-2, all virtual printers 9 registered by the administrator can be selected. To create a new virtual printer 9, the administrator directly inputs the printer name, and to associate the existing virtual printer 9 with the application, the virtual printer 9 can be selected from the pull-down menu.

For example, to execute two or more applications on the virtual printer 9, two or more virtual printers 9 are desired.

Figure 21A:
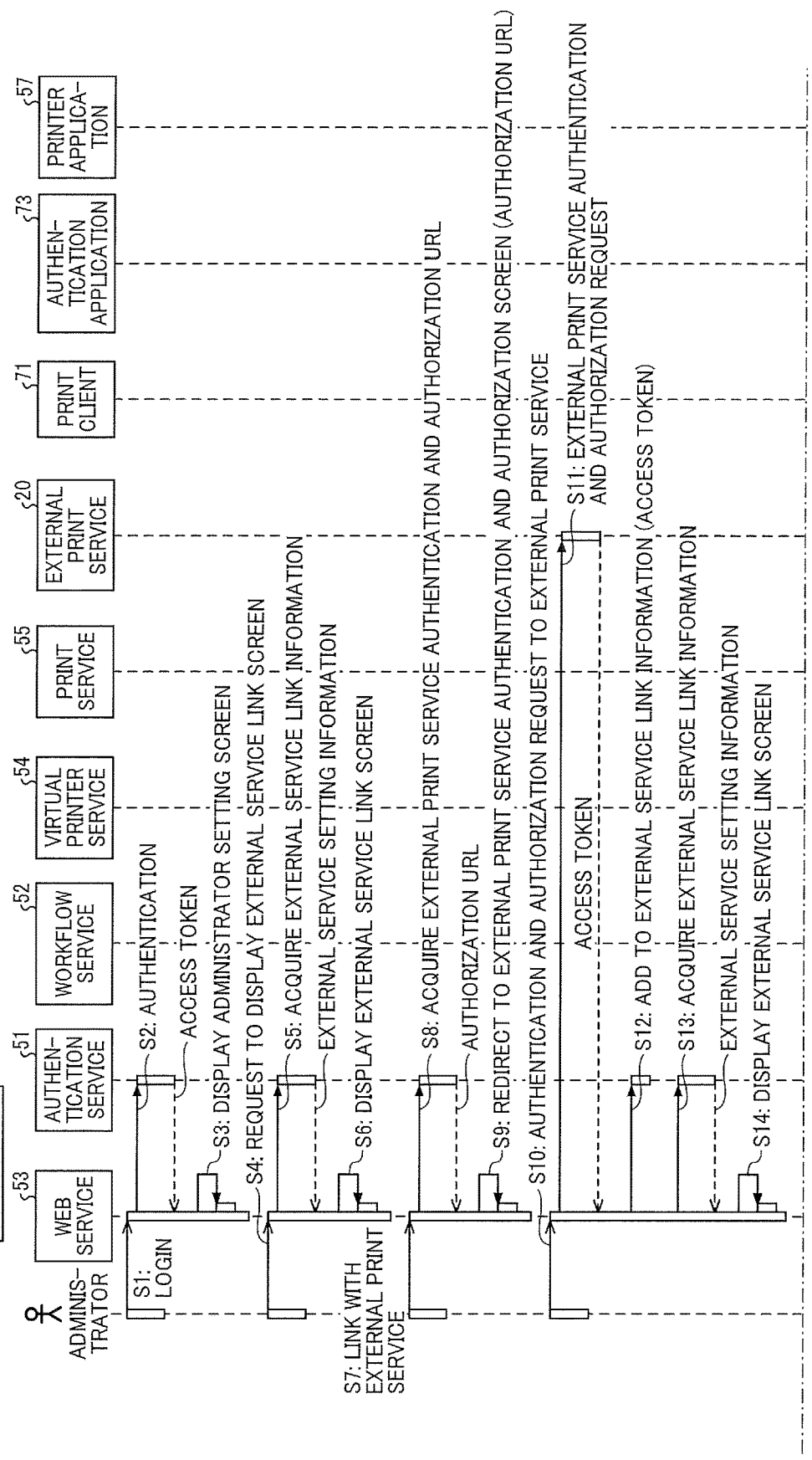
FIGS. 21AA and 21AB (FIG. 21A) and FIGS. 21BA and 21BB (FIG. 21B) are a sequence diagram illustrating an example of a process in which the virtual printer and the application are associated according to the second embodiment of the present disclosure.
Figure 21A:
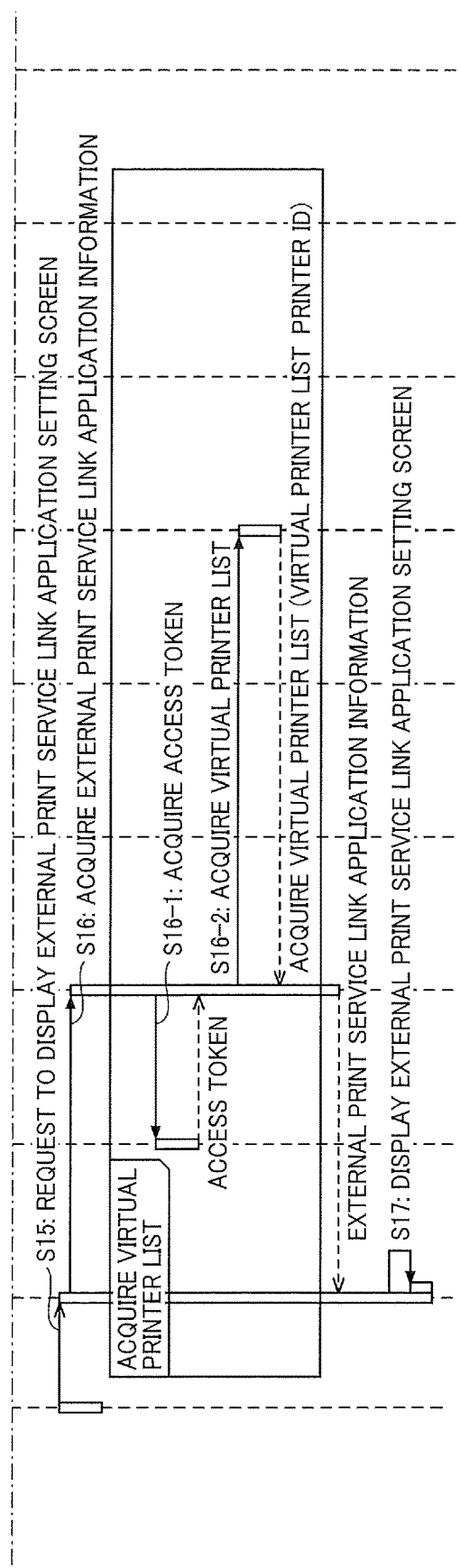
Figure 21B:
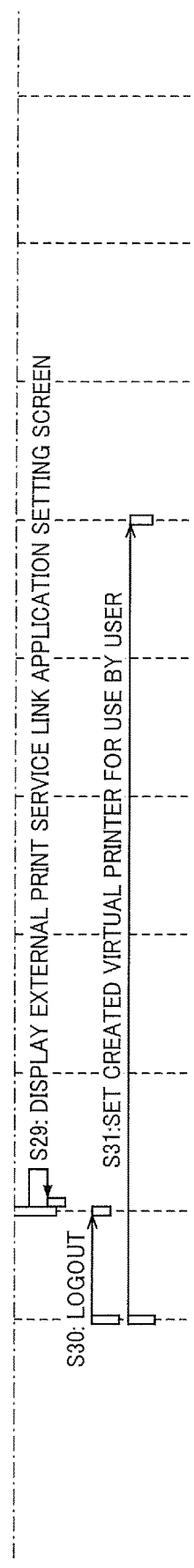

FIGS. 21AA and 21AB (FIG. 21A) and FIG. 21BA and FIG. 21BB (FIG. 21B) are an example of a sequence diagram illustrating a process to associate the virtual printer 9 with the application. In the description of FIGS. 21AA and 21AB (FIG. 21A) and FIG. 21BA and FIG. 21BB (FIG. 21B), difference from FIGS. 18A and 18B is mainly described. The process of steps S1 to S16 may be the same as in FIGS. 18A and 18B.

In step S16-1, the workflow service 52 requests the authentication service 51 for an access token (access token in Table 1) for the administrator's external print service 20. This is for the virtual printer service 54 to acquire a list of the virtual printers 9 from the external print service 20.

In step S16-2, the workflow service 52 designates the access token and requests the list of virtual printers from the external print service 20. The workflow service 52 acquires the list of virtual printers (existing virtual printer name and printer ID) that can be acquired with the access token of the administrator. The virtual printer 9 that can be acquired with the access token of the administrator is mainly the virtual printer 9 registered by the administrator.

Subsequent steps S17 to S28 may be the same as in FIGS. 18A and 18B. Steps S17 to S28 are a registration process for the new virtual printer 9.

In the case of updating the existing virtual printer 9 (when the administrator selects the existing virtual printer 9 on the external print service link application setting screen 250), the web service 53 designates the printer ID, the application ID, and the access token of the administrator issued by the external print service 20 and requests the workflow service 52 to update the virtual printer 9 in step S28-1.

In step S28-2, the workflow service 52 creates the URL of the webhook.

In step S28-3, the workflow service 52 designates the URL of the webhook, the printer ID, and the access token, and transmits the webhook registration request to the virtual printer service 54.

In step S28-4, the communication unit 29 of the virtual printer service 54 being authenticated by the access token, designates the URL of the webhook and the printer ID, and requests the external print service 20 to register the webhook in the virtual printer 9. In the case the webhook is already registered in the virtual printer 9 identified by the printer ID, the external print service 20 overwrites the webhook.

In step S28-5, the workflow service 52 updates the association between the signature of the webhook, the application ID, and the printer ID in the application information in Table 3.

Subsequent processing may be the same as in FIGS. 18A and 18B.

According to the present embodiment, in addition to the effect of the first embodiment, the administrator can select the virtual printer 9 to which the application is associated from the virtual printer 9 already registered.

In a third embodiment, a printing system in which the virtual printer 9 and the application are associated with each other in a one-to-many relationship is described. In the third embodiment, the information processing system 40 switches the application to be executed depending on which condition is satisfied.

In the first embodiment, the virtual printer 9 and the application have a one-to-one relationship. To increase the number of applications, the virtual printers 9 equal to the number of applications are to be created. In the present embodiment, the user can execute different applications with one virtual printer 9.

In the third embodiment, the hardware configuration illustrated in FIGS. 3 and 4 and the functional configuration illustrated in FIG. 5 described in the above embodiment are applicable.

In the present embodiment, the external print service link application setting screen 250 is different from that of the first embodiment.

Figure 22:
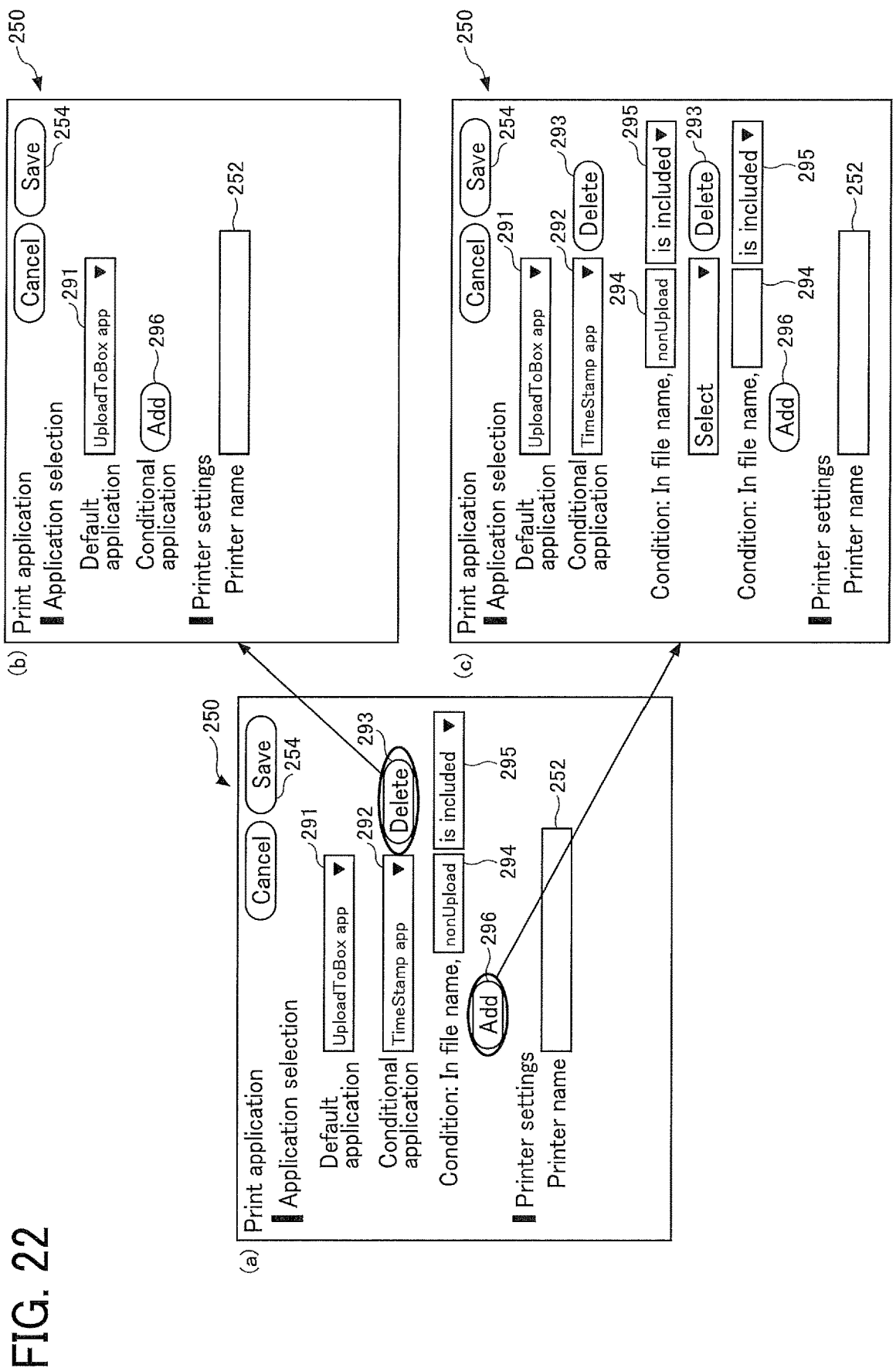
FIG. 22 is a diagram illustrating an example of the external print service link application setting screen according to a third embodiment of the present disclosure.

FIG. 22 is a diagram illustrating an example of the external print service link application setting screen 250 according to the third embodiment of the present disclosure.

In the description of FIG. 22, difference from FIG. 12 is mainly described.

The application field 251 in FIG. 12 is replaced with a default application field 291 and a conditional application field 292. The default application field 291 indicates an application selected when a condition is not satisfied. The conditional application field 292 is an application selected when the condition is satisfied.

The external print service link application setting screen 250 includes a character string field 294 and an inclusion setting field 295 close to the conditional application field 292. In the character string field 294, a character string included (or not included) in the file name of the file to be printed by the virtual printer 9 is set. For example, "included" and "not included" are set in the inclusion setting field 295.

In response to a pressing of the delete button 293, the conditional application is deleted and the external print service link application setting screen 250 illustrated in FIG. 22 (*b*) is displayed.

In response to a pressing of an add button 296, a conditional application field 292 is added as illustrated in FIG. 22 (*c*). The administrator sets the conditional application field 292, the character string field 294, and the inclusion setting field 295.

In an example of settings illustrated in FIG. 22 (*a*), in the case the user prints a file with a file name including "nonUpload", the workflow service 52 executes "Time-Stamp" application, and in the case the user prints a file with a file name not including "nonUpload" the workflow service 52 executes "UploadToBox" application.

In this way, since the plurality of applications and the printers are associated with each other and the execution conditions are set for the applications, the administrator can associate the virtual printer 9 with the applications in the one to many relationship. The information processing system 40 selects the application to be executed depending on which condition is satisfied.

Figure 23A:
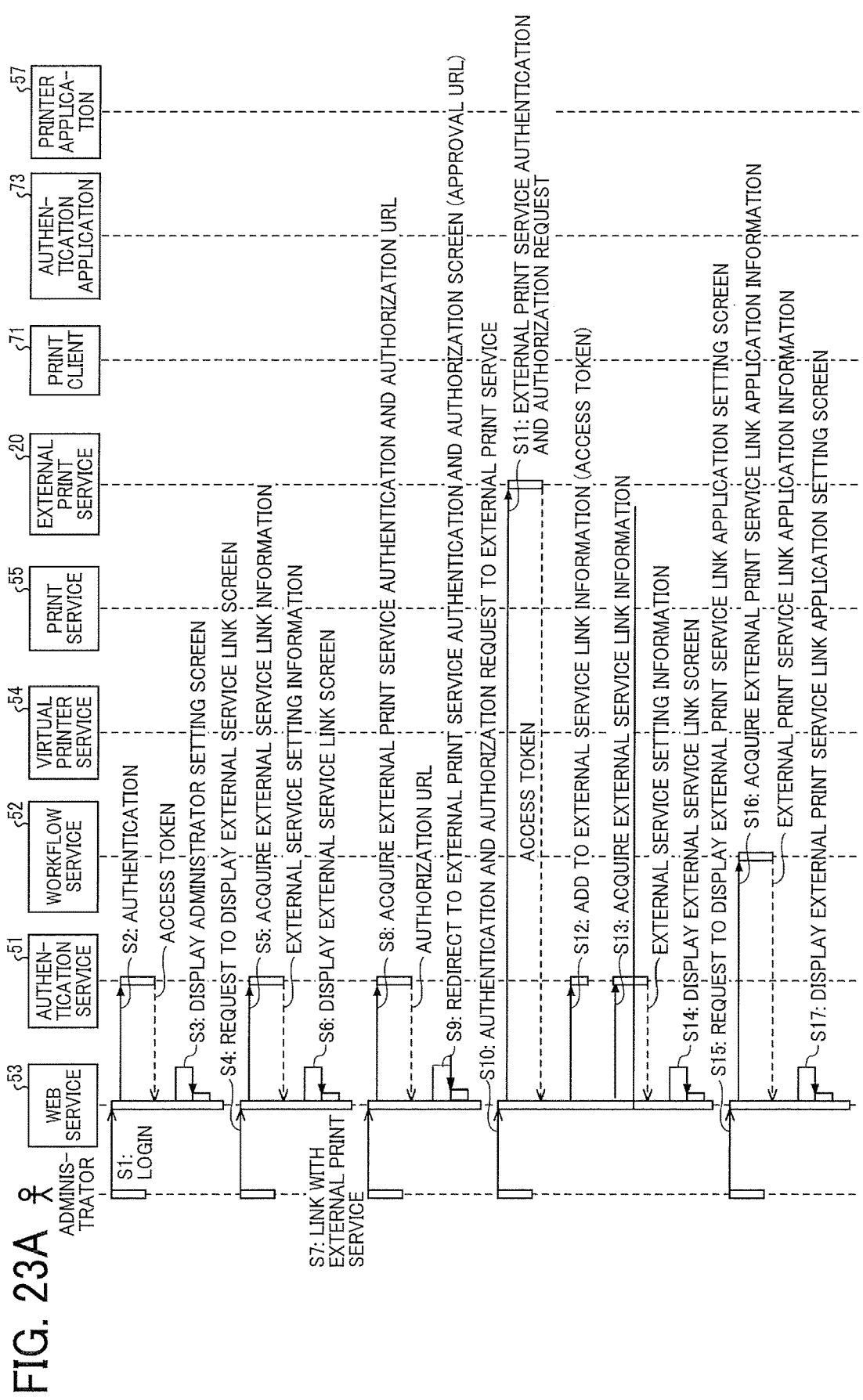
FIGS. 23A and 23B are a sequence diagram illustrating an example of a process in which the virtual printer and the application are associated according to the third embodiment of the present disclosure.
Figure 23B:
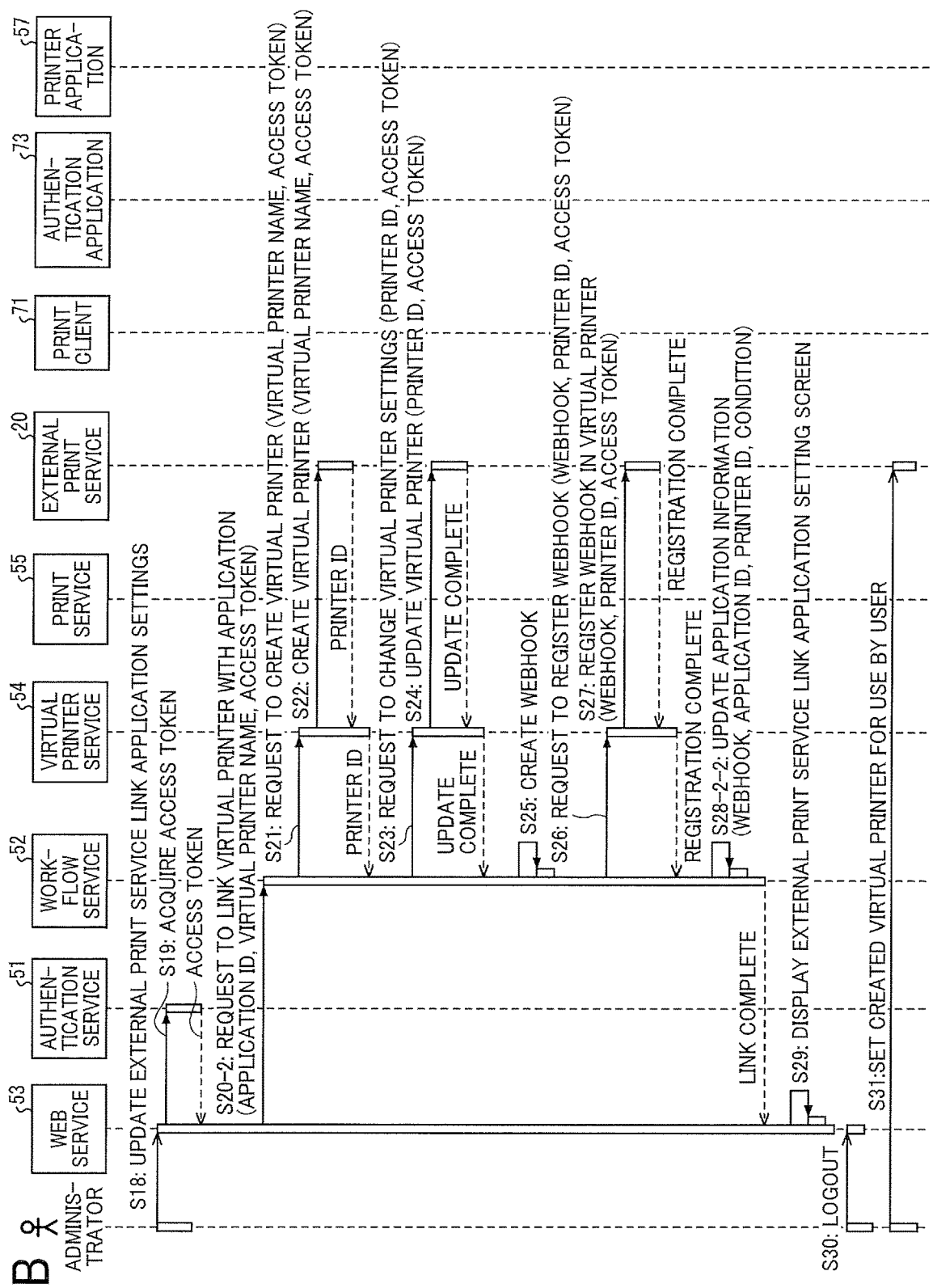

FIGS. 23A and 23B are an example of a sequence diagram illustrating a process in which the administrator associates the virtual printer 9 with the application. In the description of FIGS. 23A and 23B, difference from FIGS. 18A and 18B is mainly described. In FIGS. 23A and 23B, the processes of steps S20 and S28 are different from those in FIGS. 18A and 18B.

In step S20-2, the web service 53 designates the access token (issued by the external print service 20) and requests to establish the association between the application and the virtual printer 9 according to the conditions set by the administrator to the workflow service 52 (the application ID and the printer ID are designated).

In step S28-2-2, the workflow service 52 updates the application information in Table 3 in association with the URL (signature) of the webhook, the application ID, the condition, and the printer ID. In other words, the workflow service 52 registers the application execution conditions set in FIG. 22 in association with the application ID of the default application in the default application field.

FIG. 24 is a diagram illustrating an example of an application execution condition associated with an application ID of application information in JSON format.

DefaultAppId 301 is the application ID of the application executed in case there is no application that satisfies the following conditions (application in default application field 291).

ConditonalData 302 defines the conditional application.

AppId 303 is the application ID of the application executed when the following conditions are satisfied (application in the conditional application field 292).

"FileName" 304 in conditonalTarget indicates to give a condition to the file.

"Include" 305 in conditonalMode indicates that the method for determining the condition is "include". In alternative to "include", "starting with" etc. may be input.

"NonUpload" 306 of conditonalValue is a value used for the condition (character string in the character string field 294).

According to the present embodiment, in addition to the effect of the first embodiment, since the virtual printer 9 and the application have the one-to-many relationship, the user can execute different applications with one virtual printer 9.

For example, in the present embodiment, the information processing system 40 receives the print job for the virtual printer registered in the external print service 20 and processes the print job by the application. Alternatively, the external print service 20 does not have to be a server for printing and may be a storage service in which a user registers a general-purpose file that is not for printing. In this case as well, the information processing system 40 can process the file with the application by the same mechanism such as webhook. The information processing system 40 can also send the processed application to the storage service.

Further, in the present embodiment, the image forming apparatus 30 prints the print job, but an electronic whiteboard may display the file, or a projector may project the file.

Further, the configuration example illustrated in FIG. 5 is divided according to the main functions in order to facilitate understanding of the processing by the external print service 20, the information processing system 40, the image forming apparatus 30, and the terminal device 10. The present disclosure is not limited by the way of dividing the processing unit or the name. The processing of the external print service 20, the information processing system 40, the image forming apparatus 30, and the terminal device 10 may be further divided into more processing units according to the processing contents. Further, one process can be divided to include a larger number of processes.

The apparatuses or devices described in one or more embodiments are just one example of plural computing environments that implement the one or more embodiments disclosed herein. In some embodiments, information processing system 40 includes multiple computing devices, such as a server cluster. The multiple computing devices is configured to communicate with one another through any type of communication link, including a network, shared memory, etc., and perform the processes disclosed herein.

Further, the information processing system 40 can be configured to share the processing steps disclosed in the present embodiment, for example, FIGS. 18A and 18B, and FIGS. 19A and 19B (FIG. 19) and the like in various combinations. For example, a process executed by a given unit may be executed by a plurality of information processing apparatuses included in the information processing system 40. Further, the information processing system 40 may be integrated into one server or may be divided into a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising:
circuitry configured to:
transmit to a terminal device, screen information for receiving a name of a virtual printer and identification information of an application;
receive the name of the virtual printer and the identification information of the application from the terminal device;
create the virtual printer with the name received from the terminal device, in an external print service and acquire identification information of the virtual printer from the external print service;
store in one or more memories, the identification information of the application and the identification information of the virtual printer in association with each other;
in response to a transmission of a print job from the terminal device to the virtual printer associated with the external print service, receive information for identifying the virtual printer, and the print job from the external print service;
based on association information associating the identification information of the application and the information for identifying the virtual printer, identify the application associated with the information for identifying the virtual printer that is received; and
process the print job by the identified application.

2. The information processing system of claim 1, wherein the association information associating identification information of an application and information for identifying a virtual printer further associates identification information of the virtual printer, and the circuitry is further configured to:
transmit identification information of the virtual printer associated with the information for identifying the virtual printer that is received to the external print service; and
acquire the print job associated with the identification information of the virtual printer from the external print service.

3. The information processing system of claim 1, wherein the circuitry is further configured to transmit the print job processed by the application to an image forming apparatus, in response to a request for the print job from the image forming apparatus.

4. The information processing system of claim 1, wherein the circuitry is further configured to transmit the print job processed by the application to extraneous resource.

5. The information processing system of claim 1, wherein the print job includes identification information of a user used by the external print service, who operates the terminal device that transmitted the print job to the external print service, and the circuitry is further configured to:
acquire authorization information of the user of the terminal device, used by the information processing system, based on the identification information of the user included in the print job; and
based on the authorization information, process the print job acquired from the external print service by the application.

6. The information processing system of claim 5, wherein the identification information of the user used by the information processing system and the identification information of the user used by the external print service are the same.

7. The information processing system of claim 1, wherein the circuitry is further configured to:
in response to an authentication request transmitted from the terminal device operated by an administrator, redirect the authentication request from the terminal device to the external print service;
based on a successful authentication, acquire authorization information of the administrator from the external print service; and
create the virtual printer in the external print service with the name received from the terminal device, by using the authorization information of the administrator.

8. The information processing system of claim 1, wherein the circuitry is further configured to:
transmit to the terminal device, screen information for displaying a list of the virtual printers acquired from the external print service and for receiving the identification information of the application;
receive from the terminal device, the identification information of the virtual printer and the identification information of the application; and
store in the one or more memories, the identification information of the application and the identification information of the virtual printer in association with each other.

9. The information processing system of claim 1, wherein the circuitry is further configured to:
create a uniform resource locator (URL) and store in the one or more memories, the URL in association with the identification information of the application and the identification information of the virtual printer;
set the URL in the virtual printer of the external print service; and
receive notification on the URL from the external print service as the information for identifying the virtual printer.

10. The information processing system of claim 9, wherein
the circuitry is further configured to:
create the URL of webhook;
set the webhook in the virtual printer of the external print service; and
receive the notification on the URL with firing of an event of the webhook.

11. The information processing system of claim 1, wherein
the circuitry is further configured to:
transmit, to the terminal device, screen information of a screen including information on a plurality of applications for selection;
receive, from the terminal device, one or more pieces of identification information of one or more applications having been selected; and
store in the one or more memories, the one or more pieces of identification information of the one or more applications transmitted from the terminal device in association with the identification information of the virtual printer.

12. The information processing system of claim 11, wherein the screen further includes a setting field for setting a condition under which at least one of the one or more applications is to be executed and the circuitry is further configured to store in the one or more memories, the condition in association with the identification information of the application transmitted from the terminal device.

13. An information processing apparatus comprising: circuitry configured to:

transmit to a terminal device, screen information for receiving a name of a virtual printer and identification information of an application;

receive the name of the virtual printer and the identification information of the application from the terminal device;

create the virtual printer with the name received from the terminal device, in an external print service and acquire identification information of the virtual printer from the external print service;

store in one or more memories, the identification information of the application and the identification information of the virtual printer in association with each other;

in response to a transmission of a print job from the terminal device to the virtual printer associated with the external print service, receive information for identifying the virtual printer, and the print job from the external print service;

based on association information associating the identification information of the application and the information for identifying the virtual printer, identify the application associated with the information for identifying the virtual printer that is received; and process the print job by the identified application.

14. A processing execution method comprising:

transmitting to a terminal device, screen information for receiving a name of a virtual printer and identification information of an application;

receiving the name of the virtual printer and the identification information of the application from the terminal device;

creating the virtual printer with the name received from the terminal device, in an external print service and acquire identification information of the virtual printer from the external print service;

storing in one or more memories, the identification information of the application and the identification information of the virtual printer in association with each other;

in response to a transmission of a print job from the terminal device to the virtual printer associated with the external print service, receiving information for identifying the virtual printer, and the print job from the external print service;

based on association information associating the identification information of the application and the information for identifying the virtual printer, identifying the application associated with the information for identifying the virtual printer that is received; and processing the print job by the identified application.

* * * * *